US007921036B1

(12) United States Patent
Sharma et al.

(10) Patent No.: US 7,921,036 B1
(45) Date of Patent: Apr. 5, 2011

(54) METHOD AND SYSTEM FOR DYNAMICALLY TARGETING CONTENT BASED ON AUTOMATIC DEMOGRAPHICS AND BEHAVIOR ANALYSIS

(75) Inventors: Rajeev Sharma, State College, PA (US);
Namsoon Jung, State College, PA (US);
Hankyu Moon, State College, PA (US);
Varij Saurabh, State College, PA (US)

(73) Assignee: VideoMining Corporation, State College, PA (US)

( * ) Notice: Subject to any disclaimer, the term of this patent is extended or adjusted under 35 U.S.C. 154(b) by 0 days.

(21) Appl. No.: 12/459,282

(22) Filed: Jun. 29, 2009

Related U.S. Application Data

(63) Continuation-in-part of application No. 10/425,489, filed on Apr. 29, 2003, now abandoned.

(60) Provisional application No. 60/376,640, filed on Apr. 30, 2002.

(51) Int. Cl.
*G06F 170/60* (2006.01)

(52) U.S. Cl. ........... 705/14.66; 705/49; 705/52; 705/58; 705/67

(58) Field of Classification Search ............... 705/14.49, 705/14.52, 14.56, 14.58, 14.66, 14.67
See application file for complete search history.

(56) References Cited

U.S. PATENT DOCUMENTS

| | | | |
|---|---|---|---|
| 5,155,591 A | 10/1992 | Wachob | |
| 5,636,346 A | 6/1997 | Saxe | |
| 6,119,098 A | 9/2000 | Guyot et al. | |
| 6,182,050 B1 | 1/2001 | Ballard | |
| 6,184,926 B1 | 2/2001 | Khosravi et al. | |
| 6,269,173 B1 | 7/2001 | Hsien | |
| 6,298,330 B1 | 10/2001 | Gardenswartz et al. | |
| 6,385,592 B1 | 5/2002 | Angles et al. | |
| 6,404,900 B1 | 6/2002 | Qian et al. | |
| 6,408,278 B1 | 6/2002 | Carney et al. | |
| 6,484,148 B1 | 11/2002 | Boyd | |
| 6,904,168 B1 | 6/2005 | Steinberg et al. | |
| 7,319,779 B1 | 1/2008 | Mummareddy et al. | |
| 7,383,203 B1 | 6/2008 | Feldstein et al. | |
| 2002/0016740 A1 | 2/2002 | Ogasawara | |
| 2003/0110038 A1 | 6/2003 | Sharma et al. | |
| 2008/0243614 A1* | 10/2008 | Tu et al. ........... | 705/14 |

OTHER PUBLICATIONS

I. Haritaoglu and M. Flickner, "Attentive Billboards," 11th International Conference on Image Analysis and Processing, Sep. 26-28, 2001, Palermo, Italy.
M. H. Yang, et al., "Detecting Faces in Images: A Survey," IEEE Trans. Pattern Analysis and Machine Intelligence, vol. 24, No. 1, Jan. 2002.

(Continued)

*Primary Examiner* — John G Weiss
*Assistant Examiner* — Michael Goldman

(57) ABSTRACT

The present invention is a method and system for selectively executing content on a display based on the automatic recognition of predefined characteristics, including visually perceptible attributes, such as the demographic profile of people identified automatically using a sequence of image frames from a video stream. The present invention detects the images of the individual or the people from captured images. The present invention automatically extracts visually perceptible attributes, including demographic information, local behavior analysis, and emotional status, of the individual or the people from the images in real time. The visually perceptible attributes further comprise height, skin color, hair color, the number of people in the scene, time spent by the people, and whether a person looked at the display. A targeted media is selected from a set of media pools, according to the automatically-extracted, visually perceptible attributes and the feedback from the people.

17 Claims, 27 Drawing Sheets

OTHER PUBLICATIONS

H. Rowley, et al., "Neural Network-Based Face Detection," IEEE Trans. Pattern Analysis and Machine Intelligence, vol. 20, No. 1, pp. 23-38, Jan. 1998.

E. Osuna, et al., "Training Support Vector Machines: An Application to Face Detection," Proc. IEEE Conf. Computer Vision and Pattern Recognition, pp. 130-136, 1997.

* cited by examiner

|  | CONTENT 1 | CONTENT 2 | CONTENT 3 |  | CONTENT N |
|---|---|---|---|---|---|
| AUDIENCE PROFILE 1 | 0.6 | 0.3 | 0.1 |  | 0.05 |
| AUDIENCE PROFILE 2 | 0.3 | 0.55 | 0.05 |  | 0.0 |
| AUDIENCE PROFILE 3 | 0.1 | 0.1 | 0.7 |  | 0.0 |
| AUDIENCE PROFILE 4 | 0.2 | 0.5 | 0.05 |  | 0.1 |
| AUDIENCE PROFILE 5 | 0.3 | 0.4 | 0.2 |  | 0.1 |
|  |  |  |  |  |  |
| AUDIENCE PROFILE 6 | 0.2 | 0.2 | 0.4 |  | 0.1 |

Fig. 23

METHOD AND SYSTEM FOR DYNAMICALLY TARGETING CONTENT BASED ON AUTOMATIC DEMOGRAPHICS AND BEHAVIOR ANALYSIS

CROSS-REFERENCE TO RELATED APPLICATIONS

This patent application is a continuation in part of U.S. patent application Ser. No. 10/425,489, filed Apr. 29, 2003, now abandoned which claims the benefit of U.S. Provisional Application No. 60/376,640, filed Apr. 30, 2002.

FEDERALLY SPONSORED RESEARCH

Not Applicable

SEQUENCE LISTING OR PROGRAM

Not Applicable

BACKGROUND OF THE INVENTION

1. Field of the Invention

The present invention is a method and system for selectively executing content on a device based on automatic recognition of predefined characteristics, including visually perceptible attributes, such as a demographic profile of people, local behavior analysis, and emotional status, identified automatically using a sequence of image frames from a video stream, wherein a targeted media is selected from a set of media pools according to the automatically-extracted, visually perceptible attributes and feedback from the people, where the media comprises various kinds of stimulus, including visual stimulus, audio stimulus, and music, from various sources.

2. Background of the Invention

Companies are constantly looking for new ways to better advertise their product or service. Traditionally, advertising is commissioned through a broadcast model. Broadcasting with television, radio, billboard, magazine or newspaper ads to a broad population of people is made in hopes that some of the people in that population will actually look at or listen to the advertisement and be influenced by it. This broadcast model for advertising is, by definition, based on very large segments of the population.

The effectiveness of the advertisement can be very difficult to measure using a broadcast model. Also, it tends to be costly to implement because, in order to influence enough people with the advertisement, it has to be shown very widely. With effective ad targeting, unnecessary side effects of broadcasting can be minimized. Recent advances in processor speed and digital displays have made it possible for retail establishments to afford and utilize electronic digital billboards or displays. Although this allows for a much richer media to be presented, contemporary systems still suffer from the limitations of the broadcast model of advertising.

There have been attempts to distribute targeted advertising content in the prior art. For example, U.S. Pat. No. 6,119,098 of Guyot, et al. (hereinafter Guyot) disclosed a method and apparatus for targeting and distributing advertisements over a distributed network. However, in Guyot, advertisements are targeted to the subscriber based on a personal profile provided by the subscriber.

U.S. Pat. No. 6,182,050 of Ballard (hereinafter Ballard) disclosed a method and apparatus for distributing advertisements online using target criteria screening, which also provided a method for maintaining end user privacy. In the disclosure, the demographic information or a desired affinity ranking was gathered by the end user, who completed a demographic questionnaire and ranked various categories of products and services.

U.S. Pat. No. 6,298,330 of Gardenswartz, et al. (hereinafter Gardenswartz) disclosed a method and apparatus for communicating with a computer based on the offline purchase history of a particular consumer. The invention included the delivery of a promotional incentive for a consumer to comply with a particular behavioral pattern. In the disclosure, the targeted advertisements were changed based on changes in consumers' purchase history behaviors. In the disclosure, the consumer supplied the registration server with information about the consumer, including demographics of the consumer, to generate an online profile.

U.S. Pat. No. 6,385,592 of Angles, et al. (hereinafter Angles) disclosed a method and apparatus for delivering customized advertisements within interactive communication systems. In Angles, the advertising provider computer generated a customized advertisement based on the consumer's profile, upon receiving the advertising request. In Angles, the consumer, who wished to receive customized advertisement, first registered with the advertisement provider by entering the demographic information into the advertisement provider's demographic database.

U.S. Pat. No. 6,408,278 of Carney, et al. (hereinafter Carney) disclosed a method and apparatus for delivering programming content on a network of electronic out-of-home display devices. In Carney, the network includes a plurality of display devices located in public places, and the delivered programming content is changed according to the demographics of the people. Carney also suggests demographic data gathering devices, such as a kiosk and an automatic teller machine.

While it has interesting and versatile approaches to the programming content delivery network, there are some limitations in the data gathering devices of the prior art. One of the limitations is that the data gathering device is collocated adjacent to the display device in the prior art. However, it does not have to be that way, and it sometimes should not be. Depending on the public place environment and the business goal where the embodiment of the system is installed, there can be necessities to install the data gathering devices regardless of the position of the display device. For example, some owners of public places could want to utilize the widely-used and already installed surveillance cameras in their public places for the data gathering. The surveillance cameras are not necessarily collocated adjacent to the display devices, and usually they are not. In another example, some owners of public places could want to use wide-angle cameras or multiple cameras to gather overall demographic information and statistical data from a small group of people in a certain region of the public place during a certain time. In the above examples, the targeted content can be delivered and displayed through display devices, which do not need to be collocated adjacent to the data gathering devices, cameras. The prior art invention also briefly mentioned the use of a camera as one of the methods for gathering demographic information. However, it did not disclose sufficiently enough about the approach of how to process images to determine the demographic composition of the audience.

U.S. Pat. No. 6,484,148 of Boyd disclosed electronic advertising devices and methods for providing targeted advertisements based on the consumer profiles. The disclosure included a receiver for receiving identifying signals from individuals, such as signals emitted by cellular telephones, and the identifying signal was used for the targeted advertisements to be delivered to the individuals.

I. Haritaoglu, and M. Flickner, in "Attentive Billboards", 11th International Conference on Image Analysis and Processing, Sep. 26-28, 2001, Palermo, Italy, disclosed a real-time vision system, which detected, tracked, and counted the number of people standing in front of billboards. Haritaoglu briefly mentioned their attempt for an automatic demographics measurement. However, Haritaoglu does not explicitly teach how to measure the demographics automatically at all, other than the mere indications of their attempt, whereas the present invention explicitly discloses a specific method of how to measure the demographics automatically, particularly using Support Vector Machine (SVM)-based age and gender classifiers, to determine the age and gender of the person in the images in an exemplary embodiment. The present invention further discloses key steps in the automatic demographics measurement.

Although, in the prior art, there have been attempts to customize advertising content using demographic information, the bottleneck was to gather the demographic information efficiently and automatically in real-time. This was especially true for the audiences in a public place. The conventional approaches for gathering the demographic information, which require the audiences' feedback, such as using questionnaires, registration forms, or electronic devices, are often found to be cumbersome to the audience. Furthermore, in the case of using questionnaires or an offline purchase history, the gathered information is not real-time data, so it does not reflect the current demographic information of the current audience in a specific public place during a specific time. Since they are not real-time data, but previously saved data, the effect of targeted advertisement diminishes. Thus these problems in the prior art require an automatic and real-time approach for gathering the demographic information from the audience in a public place.

In a preferred embodiment, the present invention is a system for selectively executing targeted media on a display device based on the automatic recognition of the predefined visually perceptible attributes associated with people in the view of the camera or set of cameras, providing an efficient and robust solution, which solves the aforementioned problems in the prior art. Computer vision algorithms have been shown to be an effective means for detecting people. These algorithms also have been shown to be effective at extracting relevant demographic features of the people in the view of the sensor or set of sensors. This allows for the possibility of connecting the visual information from a scene to the behavior and content of a digital media. The invention allows freedom of installation position between data gathering devices, set of cameras, and display devices. The invention also automatically gathers the demographic information from the people without involving any hassle of feeding information provided manually by the people. The invention also processes the demographic information gathering in an efficient and robust way, and enables real-time customization of the targeted content.

U.S. Pat. Appl. Pub. No. 20020016740 of Ogasawara (hereinafter Ogasawara) disclosed an electronic shopping system that provides customer recognition with wireless identification. Ogasawara also sends visual data to point-of-sale (POS) terminals. However, Ogasawara does not show the novel and unobvious features in the present invention. Automatic image processing to obtain demographic information and visually perceptible attributes from images of people are foreign to Ogasawara. Although Ogasawara disclosed a method for obtaining visual image data of particular customers at the time each customer enters the establishment, Ogasawara is clearly foreign to the idea of automatic image processing to obtain demographic information or the visually perceptible attributes. In Ogasawara, such demographic information is not obtained from the captured images, but rather from previously recorded demographics data accessed using the customer's ID. In Ogasawara the demographics data is already stored in a loyalty database, and image data for each customer is made available for the establishment's personnel to recognize and greet each customer on a personal basis, rather than an automatic image processing to obtain demographic information.

The definition for the demographic information in Ogasawara includes features that cannot be calculated using a computer vision algorithm. The approaches as to how the demographic information and visually perceptible attributes are gathered and applied in the embodiments are significantly different between the prior arts and the present invention. In the present invention, the demographic information is a part of the visually perceptible attributes, and it refers to the visually perceptible demographic information, such as gender or age, by computer vision-based demographic classification technology. Ogasawara's definition for the demographic profile information includes a customer's name, address, telephone number, date of birth, family status, and number of children, which are stored in the information storage area of the customer ID card. These features cannot be automatically measured by the computer vision-based demographic classification technology. Therefore, not only is Ogasawara foreign to the method of automatic demographic classification based on the automatically-detected facial images of people using a computer vision-based demographic classification technology, without requesting any input from the people, but also the focus of the demographic information in Ogasawara is clearly different from the focus of the demographic information in the present invention. The present invention is clearly focused on the demographic information that can be visually measured.

In line with the goal for the automatic method of obtaining the demographic information in the present invention, the present invention does not require any involvement from the customers to obtain the demographic information in the preferred embodiment. The present invention considers the requirement for the cumbersome involvement as a problem to solve in the prior arts. Ogasawara requires a cumbersome involvement from the customers by requesting customers to carry the card with them. This is one of the limitations in prior arts that the present invention tries to overcome. Ogasawara disclosed a method that seeks to customize the sales presentation/advertisements based upon customer profile/demographics. In Ogasawara, this customization is done manually by the store employee and is not automatically based on the demographic data.

Furthermore, Ogasawara does not disclose a method for customizing advertising according to said demographic information and for displaying said targeted media on said means of displaying the content. Ogasawara disclosed a means of displaying the visual image to the store employee, but not a targeted media based on captured demographic information.

U.S. Pat. No. 5,155,591 of Wachob (hereinafter Wachob) disclosed a system that provides different commercial messages to different demographically-targeted audiences for cable television or satellite broadcasting system. Wachob noted the use of a user demographic key on a handheld remote control and household survey, diary information, known address, neighborhood locations, or known ethnic locations as ways to determine demographic types. Wachob is clearly foreign to the idea of automatic image processing to obtain demographic information or the "visually perceptible attributes," particularly for the customers in a retail space. The definition for the demographic information in Wachob includes features that cannot be calculated using a computer vision algorithm. Wachob disclosed household survey, diary information, address, neighborhood locations, or ethnic locations as methods of determining individual viewer demographic types, which shows that the definition for the demographic information in Wachob is also different from the present invention.

Wachob does not select the content based upon automatically-captured demographic data. It selects the content based upon demographic data that is entered by a viewer using a device such as remote control or household survey. Wachob noted that the demographic data is entered by a viewer using a remote control, and then the demographic data is used for targeting the content for the television. As discussed, there is no disclosure about automatically capturing the demographic data from visual images and using the demographic information to target content.

Furthermore, the demographic information in the present invention is primarily concerned with the customer in a retail store, whereas the demographic information in Wachob is primarily concerned with the television-viewing consumers, so the approaches as to how the demographic information is gathered and applied in the embodiments are significantly different between Wachob and the present invention. The computer vision algorithms in the present invention deal with the obstacles in the retail environment, which may or may not be applicable for the customers in a television-viewing environment.

In the above prior arts, the approaches as to how the demographic information and visually perceptible attributes are gathered and applied in the embodiments are significantly different between the prior arts and the present invention. This significant difference clearly shows the novelty and unobviousness of the present invention over the prior arts. Consequently, the methods in prior arts will not work when the customers do not cooperate with the requirement of their involvement for the systems. For example, if customers do not carry the customer ID card or tag, or if they forget to bring it to the establishment, Ogasawara will not work. If the input device, such as a remote control, is broken or lost, the viewer will not be able to enter the demographic data in Wachob. Therefore, it is an objective of the present invention to overcome cumbersome involvement from the customers.

U.S. Pat. No. 6,269,173 of Hsien (hereinafter Hsien) disclosed an instant response broadcast board system that operates based on the detection of the movement of objects in front of the board. Hsien is entirely foreign to the idea of obtaining demographic information of customers. Furthermore, Hsien explicitly noted that the interactivity with customers is one of the key ideas in Hsien. Whereas, the present invention explicitly noted the need of an automatic approach for gathering the demographic information, and explicitly disclosed that the present invention teaches a step for automatically obtaining demographic information of people from face images, whereby interaction by the people for obtaining said demographic information is not needed.

U.S. Pat. No. 6,904,168 of Steinberg, et al. (hereinafter Steinberg) disclosed an image analysis engine with multiple sub-engines, each dedicated to different attributes of an image. Steinberg does not teach a step of selecting digital media to be displayed on a digital device based on the automatically-extracted, visually perceptible attributes. Furthermore, Steinberg is entirely foreign to the automatically-extracted, visually perceptible attributes that comprise gender, age range, number of people, gaze characteristics, height, hair color, skin color, clothing, and time spent in front of the means for playing the content. In Steinberg, none of the "shape analysis engine," "skin tone analysis engine," "texture analysis engine," "textual analysis engine," and "curvature analysis sub-engine," teaches the "automatically-extracted, visually perceptible attributes," that comprise gender and age range in the present invention, and they are entirely different ideas.

U.S. Pat. No. 5,636,346 of Saxe (hereinafter Saxe) disclosed a system for delivering targeted advertisements and programming to demographically-targeted television audiences. Saxe did not explicitly teach how to automatically-extract, visually perceptible attributes of each person, wherein the visually perceptible attributes comprise demographic information, including gender, age, height, skin color, and hair color, using captured images of the people in front of a display.

U.S. Pat. No. 7,383,203 of Feldstein, et al. (hereinafter Feldstein) disclosed a system and method for dynamically providing a user with personalized, data based on user input, and tracking the user input for providing data that is automatically updated in real time with network tracking techniques. Feldstein explicitly noted demographics based on the user submitted information, and Feldstein is entirely foreign to the idea of automatically extracting visually perceptible attributes of each person, wherein the visually perceptible attributes comprise gender, age, height, skin color, and hair color, using at least a Support Vector Machine (SVM) that is trained for age and gender for selectively executing targeted media on a display, whereby interaction by the individual or the people for obtaining the demographic information is not needed, as disclosed in the present invention.

"Place-based media" (PBM) are the media vehicles that provide local information and advertisements to the audience present at a particular location. Digital signage is a typical example of such media. Unlike media such as cinema, television, or the Internet, place-based media does not have a captive audience. In many cases, the primary motivation for the audience present in the location is not media consumption, but something else, such as shopping, pumping gas, working out, etc. PBM relies on interrupting the audience with exciting information, therefore offering relevant and highly-targeted content is extremely important.

The current invention analyzes and segments the available audience in real-time, based on various visible parameters, and dynamically provides relevant content. The system can also predict the audience composition at a given time, based on historical trends, and plays content based on that information.

The system segments audience members based on the information from their facial features (such as age, gender, and ethnicity), emotional state (such as happy, sad, and tired), and behavior (such as dwell time, impression duration, direction of travel, party composition, etc.). The system then selects and plays the most relevant content for the audience from a bank of contents.

The system can also capture their feedback and analyze it to measure the affinity of various audience segments to a particular content, to intelligently match audience segments and content. Feedback captured by the system includes changes in their behavior and emotional state. It can also integrate other forms of feedback metrics, such as sales, website visits, short message service (SMS) texting, etc.

The current video analysis technology is capable of following the movement of people in a retail space and recognizing their behaviors, emotional states, and some of the personal profiles based on their visual features. More specifically, visual tracking technology can find any person in a camera view, and track the person across multiple camera views. If such system is deployed in a retail space, it can monitor how the customers move around the retail space to find and purchase products. The personal profiles of the customers—such as gender, age, and ethnicity—can also be recognized by analyzing their facial images. Further, facial image analysis may also monitor the changes in their emotional states, based on changes in their facial expressions or behaviors. As the needs and interests of the customers vary with their demographic background, customizing the media content toward these measurable customer profiles will improve the effectiveness of the media. The changing needs and interests of a customer can also be estimated based on her/his shopping history in that particular shopping trip and also on changes in emotional states.

The present invention combines the aforementioned technologies to measure the individual needs of the customers to customize the media content played to them in real time. First, the visual tracking technology can track a potential consumer of the media to record the person's shopping history—i.e., for which product the person has been shopping or which services the person has been using. The demographic class or the emotional state of the customer is also measured, based on facial image analysis, before the person is exposed to the media. The media control of the system then prepares and plays a customized media content. The media control may employ a fixed set of rules to find an appropriate media content among a pool of available media contents. The same kind of technology that analyzes facial images to estimate the emotional state of the customer can be used to measure the changes in emotional state and attention while the media is being played. This information—media response—may be fed back to the media control module to improve the media customization scheme, so that the effectiveness of the media selection can be improved for the next cycle.

On the other hand, there is a crucial issue of how to change the media customization scheme based on the feedback from the media response. One simple way would be to test many possible mappings between the media content and the audience profiles, and choosing the mapping that receives the overall best responses. This scheme assumes that there is a fixed set of media content, and that the market environment, such as consumer tastes or trends, is static. However, both the available media contents and the trends are constantly changing. The present invention models the media customization as an interaction between an agent, i.e., a media control module, that controls media content and the environment of the media audience; the media control (agent) selects and displays media content to the audience (action), and the audience feeds back the response (reward) to the agent. Then, the agent makes an appropriate adjustment to the media selection rules, so that the later response feedback would be improved. The present invention employs reinforcement learning as a specific means to solve the problem. The reinforcement learning scheme iteratively explores the space of possible media selection rules, and finds a solution that yields the optimal long-term responses from the audience.

SUMMARY

In an exemplary embodiment, the present invention is a system for selectively executing targeted media on a display device based on the automatic recognition of the predefined characteristics associated with people in the view of the camera or set of cameras. In this particular embodiment, there are three components of the invention in the exemplary embodiment: a person detector (PD), a person classifier (PC), and an Ad server (ADS).

The PD takes as input a set of video frames. It then analyzes the frames and determines the number of people in the set. It also extracts the relevant features of each person, including visually perceptible attributes. The features include, but are not limited to, the following: gender, age range, gaze characteristics, height, hair color, skin color, clothing, and time spent in front of the display. An event is defined as an occurrence of a person in the field-of-view. When a person exits the field-of-view, the PD passes on the features of that person to the PC.

The PC maintains a database of people that it has seen. As a PD sends a description of a person to the PC, the PC determines if this is a new person or a person already in the database. If the person is a new person, then this person is added to the database. If the new person matches one already in the database, then the event is recorded for the person in the database. Finally, the PC will send a message to the ADS, telling it that the database has been updated with a new event.

The ADS is a rule-based system. It manages the media selection rules and the media pools. A business rule is an if-then rule. The antecedent, i.e., the "if" part of the rule, is a set of conditions based on events. When the antecedent is evaluated true, the consequence, i.e., the "then" part of the rule, is executed. The consequence contains action statements that determine from which media pool the next advertisement will be selected. Once a selection is made, the media is executed on the desired device.

In a particular embodiment of the present invention, a retail store has several digital displays. Each display has an associated camera system. Each camera system is connected to its own PD. There is a central PC that is used to aggregate the results of the PDs. The ADS has rules that make sure that any one person does not see the same content too many times. The number of times is dependent on the content to be displayed. This system is an example of how a retail store can track exactly who is seeing their media and how often, through a network of PDs.

Another exemplary embodiment of the present invention provides the ability for a kiosk to manage the digital advertising space it contains. In this case, the media selection rules are set up to ensure that a sequence of advertisements is displayed to a person of a certain gender and age range, and that a completely different sequence of advertisements is displayed to a person of a different gender and age range. In this system, the PD, PC, and ADS are all installed and running on the same CPU.

In another exemplary embodiment, the present invention is a method and apparatus for selectively executing targeted media on a means for playing content. The present invention captures a plurality of images for an individual or people using a single or a plurality of means for capturing images. A single or a plurality of face images of the individual or the people are detected from the plurality of images. The present invention automatically extracts visually perceptible attributes of the individual or the people from the single or plurality of face images. In the exemplary embodiment, the visually perceptible attributes comprise demographic information, local behavior analysis, and emotional status. A targeted media is selected from a set of media pools, according to the automatically-extracted, visually perceptible attributes. The targeted media is played on the means for playing content.

The visually perceptible attributes further comprise height, skin color, and hair color. The present invention automatically extracts the visually perceptible attributes in real-time. For example, the number of people in the scene, time spent by the people in the vicinity of the display, and whether or not a person looked at the display are automatically determined. The present invention applies a set of media selection rules to a new event that is generated by a person recognizer for the detected person.

The present invention classifies the demographics for multiple people and selects the content according to the analysis of the composition of the multiple people, based on a rule. In addition to the demographic classification, the present invention analyzes the behavior of people in the vicinity of the means for playing content. The behavioral analysis provides valuable visual attributes of the people, such as emotional state of the people, in response to the content.

The present invention customizes and optimizes the targeted media from a set of media pools in real-time, based on the automatically-extracted, visually perceptible attributes, including the demographic information. The media comprises any kind of stimulus, including visual stimulus, audio stimulus, and music.

The media content is selected in an intelligent manner, based on the feedback from the people in the present invention, and the processes are as follows:

1) playing random content on the means for playing content
2) automatically analyzing the response(s) of the people to the randomly played content,
3) scoring the content based on the response analysis according to demographic, behavioral, and emotional attributes of the people, and
4) playing a matching content for the people, based on the score according to the demographic, behavioral, and emotional attributes.

In an exemplary embodiment, the selected digital media is displayed on a network of digital devices, based on the automatically-extracted, visually perceptible attributes, including the demographic information.

In an exemplary embodiment, it is an objective of the present invention to process the content search and selection in the Internet and retrieve the content from the Internet, based on the automatically-extracted, visually perceptible attributes. In another exemplary embodiment, the present invention sends the selected content to a mobile device. The present invention can process the images captured by any means for capturing images, such as the cameras that are installed in a mobile device. The mobile device includes a mobile phone, a cart, and a Bluetooth-based device.

The method of extracting the demographic information comprises the use of at least a Support Vector Machine (SVM) that is trained for age and gender. Using a large number of training images, a demographic classifier is trained at the training step. The demographic classification of the input images at the actual execution can be processed in real-time using the trained demographic classifier, and the media content is dynamically narrowcast, based on the real-time output of the demographic classification.

In another exemplary embodiment, the present invention processes the demographic classification before the actual appearance of the people in the vicinity of the means for playing content. In this exemplary embodiment, at least a second means for capturing images is installed in places where the means for playing content is not located. The visually perceptible attributes are automatically extracted from the images captured from the second means for capturing images. Then, the media content is played while the people are approaching the means for playing content, in order to entice the people to the display. The idea is based on the assumption that the media content customized based on the automatically-extracted, visually perceptible attributes may appeal more to the people around the display than the media content that is played without the customization.

In another exemplary embodiment, the present invention changes the media selection rule based on the feedback from the audience using the reinforcement learning framework. The scheme models the media customization as an interaction between an agent, i.e., a media control module that controls media content, and the environment of the media audience; the media control (agent) selects and displays media content to the audience (action), and the audience feeds back the response (reward) to the agent. Then, the agent makes an appropriate adjustment to the media selection rules, so that the later response feedback would be improved. The present invention employs temporal difference learning as a specific method to change the media control rules.

DRAWINGS

Figures

FIG. 23 shows an exemplary implementation of media selection rules.

DETAILED DESCRIPTION OF THE INVENTION

Figure 1:
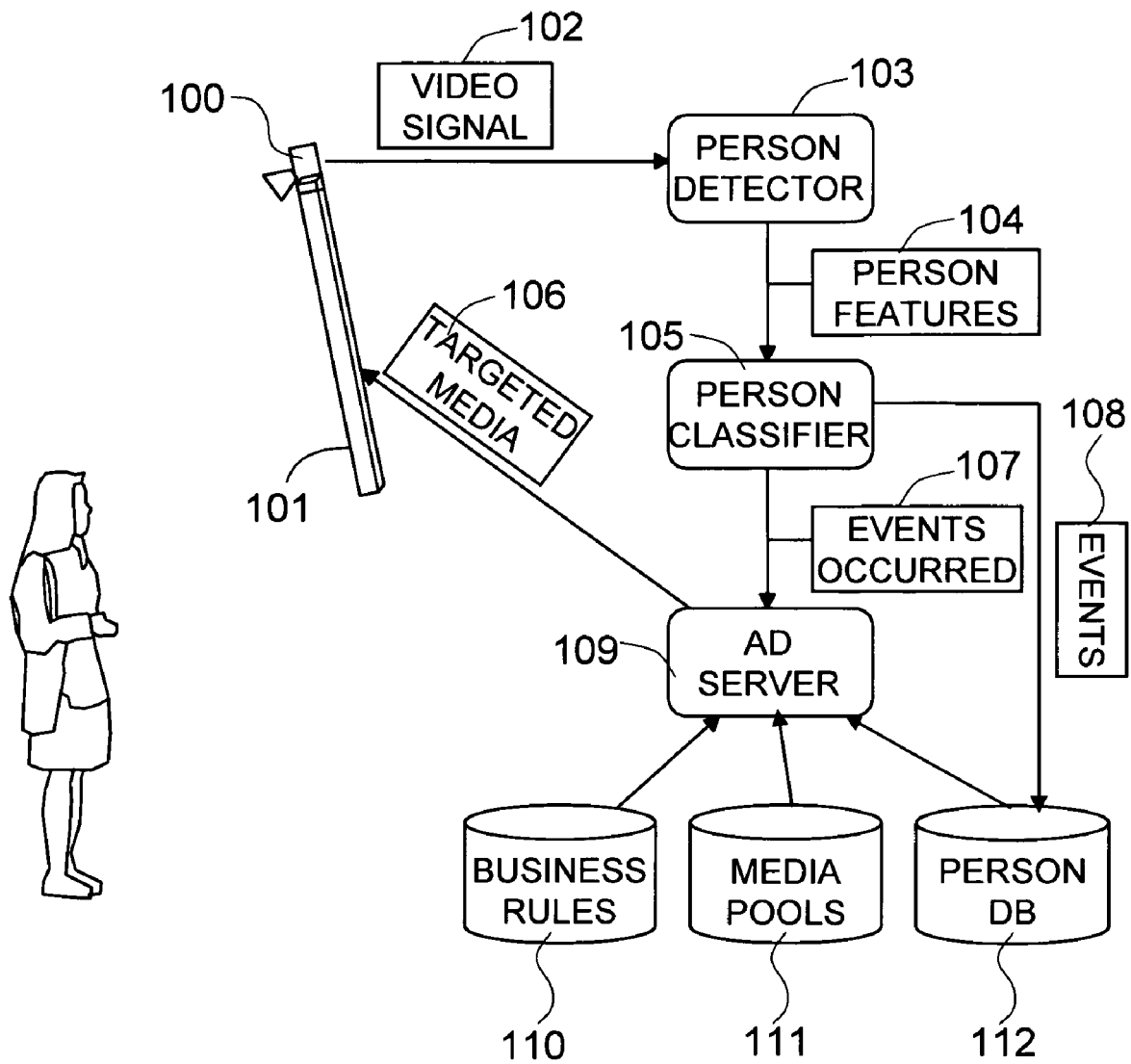
FIG. 1 shows a block diagram of the components in an exemplary embodiment of the present invention.

FIG. 1 shows a block diagram of the components in an exemplary embodiment of the present invention.

The present invention is directed to the playing of media (images, video, etc.) that is appropriate for the people who are either looking at digital signage 101 or in the view of the camera system or sensor 100. This is termed "narrowcasting." To achieve this objective, the invention processes images to detect people and extract salient demographic and behavioral features of the people in the scene, then applies the supplied business rules 110, i.e., exemplary media selection rules, and media pools 111, and displays media that is appropriate for the people in the scene. The business rules 110 and media pools 111 are specific to the particular embodiment of the invention. In this exemplary embodiment, this invention may not determine what the appropriate media selection rules and media pools should be, but instead only facilitates the use of media selection rules and media pools provided to satisfy a given situation. In a preferred implementation, the present invention will identify each person based on the features extracted, and match those features to features of people that have been collected over a period of time on a networked system or standalone.

Referring to an exemplary embodiment of the invention depicted in FIG. 1, the narrowcasting system is implemented using a single camera 100 mounted on top of a digital sign 101. While one camera and one digital sign are shown in the exemplary embodiment of the invention, it will be appreciated that additional cameras and additional digital signs can be added. Also additional PDs can be used. The embodiment of the invention can be a standalone system or a networked system, such as in the conventional client and server network model. In addition, the invention is not limited by the feature extraction techniques described below. The feature extraction techniques described in this section refer to a particular embodiment of the invention. The camera transmits a video signal 102 to the person detector (PD) 103. The PD then determines the number of people in the scene, and it then extracts the salient demographic features of each person and sends the features 104 to the person recognizer (PR) 105. The PR compares the features 104 it received to the features of each of the people in the person database 112. If the new features 104 match any of the people's features in the person database 112, then the current event 108 is added to the person in the person database 112. If the new features 104 do not match any of the people's features in the person database 112, then the new person, represented by the new features 104, is added to the person database 112. The PR 105 then sends an event-occurred message 107 to the Ad server 109. The Ad server (ADS) 109 determines which business rule to apply from the set of business rules 110, based on the new event 107. Once a rule is selected, then the appropriate targeted media 106 is selected from the set of media pools 111. The targeted media 106 is then displayed on the digital sign 101.

Figure 2:
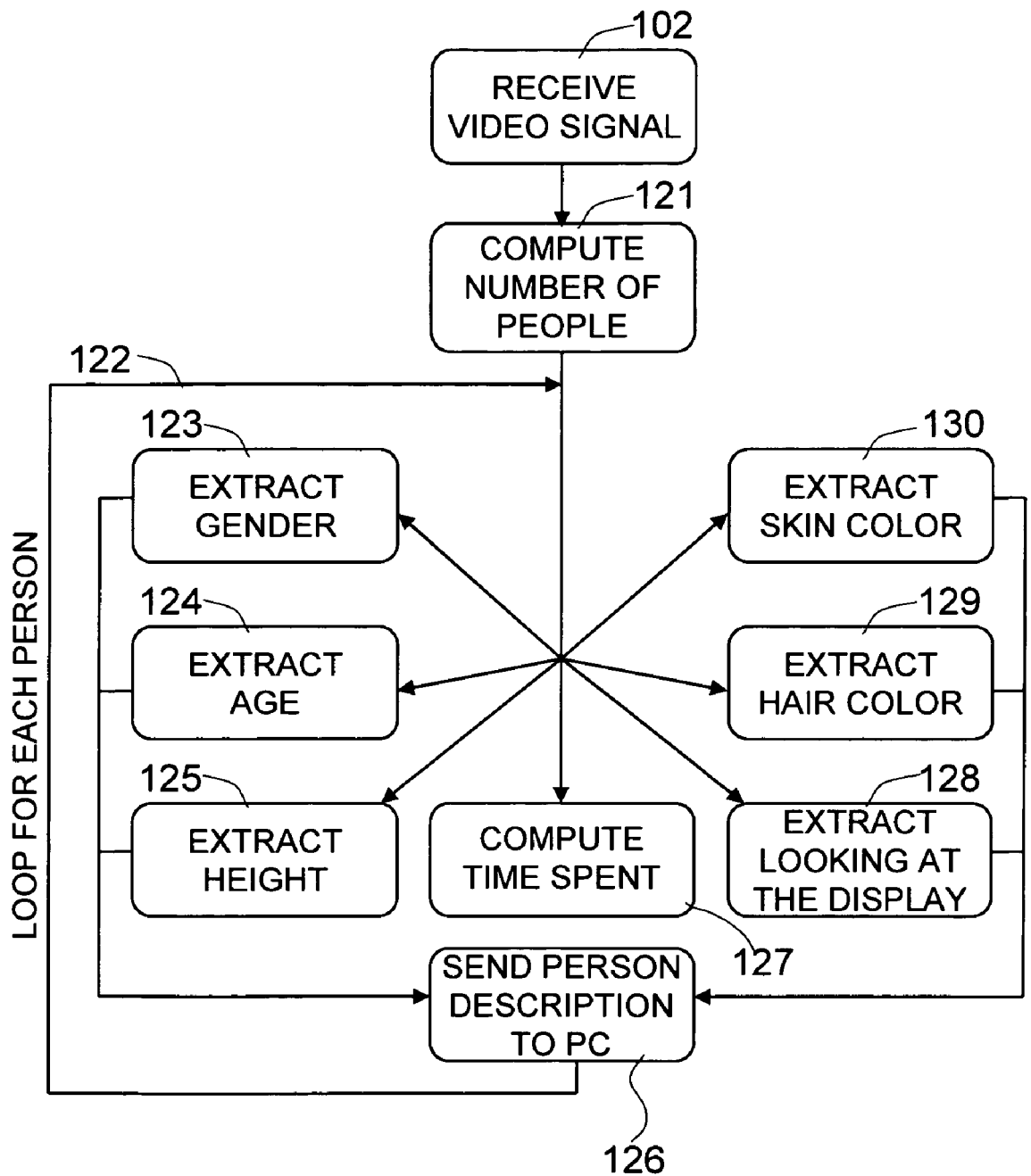
FIG. 2 shows a block diagram of an exemplary person detector.

FIG. 2 shows a block diagram of an exemplary person detector.

In an exemplary embodiment of the invention, FIG. 2 describes the details of an exemplary embodiment of the PD. After the video signal (video frame) 102 is received, the first action the PD performs is to detect and compute the number of people 121 in the video frame. The number of people can be calculated using the following methods. The methods described in the following sections refer to particular embodiments of the invention, and the invention is not limited by the particular methods described here.

One method of calculating the number of people is to use a face detector within the camera view. In a particular exemplary embodiment of the invention, the method can scan multi-level windows over the image, feeding the pixel data of the window to a multi-level neural network. In this particular embodiment, the neural network can be made to return a 1 if there is a face in the currently scanned window, and a 0, otherwise. The upper left corner pixel coordinates of the window, in which a face is detected, can be stored when a face is detected for future processing.

In the exemplary embodiment shown for the face detection, in FIG. 2, any robust, reliable, and efficient detection method can be used. In U.S. Pat. No. 6,184,926 of Khosravi et al. and U.S. Pat. No. 6,404,900 of Qian, et al., the authors disclosed methods for human face detection. In M. H. Yang, D. J. Kriegman, and N. Ahuja, "Detecting Faces in Images: A Survey," IEEE Trans. Pattern Analysis and Machine Intelligence, Vol. 24, No. 1, January 2002, the authors describe various approaches for the face detection. In the exemplary embodiment, a neural network-based face detector or an SVM-based face detection method may be used. H. Rowley, S. Baluja, and T. Kanade, "Neural Network-Based Face Detection," IEEE Trans. Pattern Analysis and Machine Intelligence, Vol. 20, No. 1, pp. 23-38, January 1998, explains the neural network-based face detector in more detail. E. Osuna, R. Freund, and F. Girosi, "Training Support Vector Machines: An Application to Face Detection," Proc. IEEE Conf. Computer Vision and Pattern Recognition, pp. 130-136, 1997 explains the SVM-based face detection approach in more detail.

Another method of counting people can be a method that is able to count people without seeing their face. For example, in an exemplary embodiment, this method can rely on using person silhouette matching for detecting people whose faces are not present in an image frame. The total number of people in the video frame is the sum of the number of people detected by the aforementioned exemplary methods. The next step is for each demographic feature extraction to operate on the people that were detected.

Gender extraction 123 can be performed on the face images extracted by the face detection method discussed above. In the exemplary embodiment, the gender extraction module can implement a Support Vector Machine (SVM), which has been trained with training face images to classify gender. Once a frontal view of a person's face is extracted and rescaled to a certain size image, such as a 30×30 face image, the 30×30 window of pixels can be input into the SVM. The SVM can be programmed to output a 1 for male and a 0 for female.

Age extraction 124 can be performed on the face images extracted by the face detection method discussed above. In the exemplary embodiment, the age extraction module can implement a Support Vector Machine (SVM), which has been trained with training face images to classify age. Once a frontal view of a person's face is extracted and rescaled to a certain size image, such as 30×30 face image, the 30×30 window of pixels is input into the SVM. The SVM can be programmed to output a determination of a person's age range. In the exemplary embodiment, there can be three age categories: under 18, 18-40, and over 40. The present invention is not limited to the number of age ranges. The number of age ranges is selected based on the particular embodiment of the invention that satisfies the particular application.

In the exemplary embodiment, the system can utilize Support Vector Machine (SVM)-based age and gender classifiers, to determine the age and gender of the person in the images. One of the key elements of an SVM-based recognition technique is the learning phase. In the exemplary learning phase for the gender classification, a few thousand images for male and female faces are collected, and are used as input for training the gender recognition system. A similar training procedure is followed for age classification. Examples of demographic classification for gender and age are described in detail in U.S. Pat. Appl. Pub. No. 20030110038 of Sharma, et al. (hereinafter Sharma 20030110038) and in U.S. Pat. No. 7,319,779 of Mummareddy, et al. (hereinafter Mummareddy), respectively.

Height extraction 125 can be performed by using the geometry of the camera setup. The height extractor will know how high and at what angle of inclination the camera is mounted. By using simple geometric calculations, a determination of a person's height can be calculated.

Computing time spent 127 can be performed by measuring the number of frames in which the person was in the view of the camera. The measure of time spent in front of the camera can be calculated from a simple calculation of the number of frames per second that can be processed multiplied by the number of frames the person was in which the person was in the view of the camera.

Skin color extraction 130 can be performed using the results of the neural network face detector, described above, and then calculating the mean and variance of the color in the detected face image. The skin color extractor is not limited by working in RGB color space. If necessary, the set of pixels from the detected face image may be transformed into another color space (e.g., LAB or CRCGI), and then the mean and variance is calculated.

Hair color extraction 129 can be performed using the results of the neural network face detector described above. Once the face is detected, a region above the face that represents the hair region is extracted. The mean and variance of the color in the hair region is then calculated. The hair color extractor is not limited by working in RGB space. If necessary, the set of pixels that represent the hair region may be transformed into another color space (e.g., LAB or CRCGI), and then the mean and variance is calculated.

Determination of a person looking at the display 128 can be a simple outcome of the method of person detection described above. The neural network face detector will detect a person who is looking at the display. The orientation of gaze can be different from that of head (face), but the neural network face detector can be trained to capture frontal face images with a little degree of freedom for the head orientation, and this frontal face image capturing can approximate the determination of a person looking at the display.

The methods described in the following sections refer to particular embodiments of the PR and ADS of the invention, and the invention is not limited by the particular methods described herein.

Figure 3:
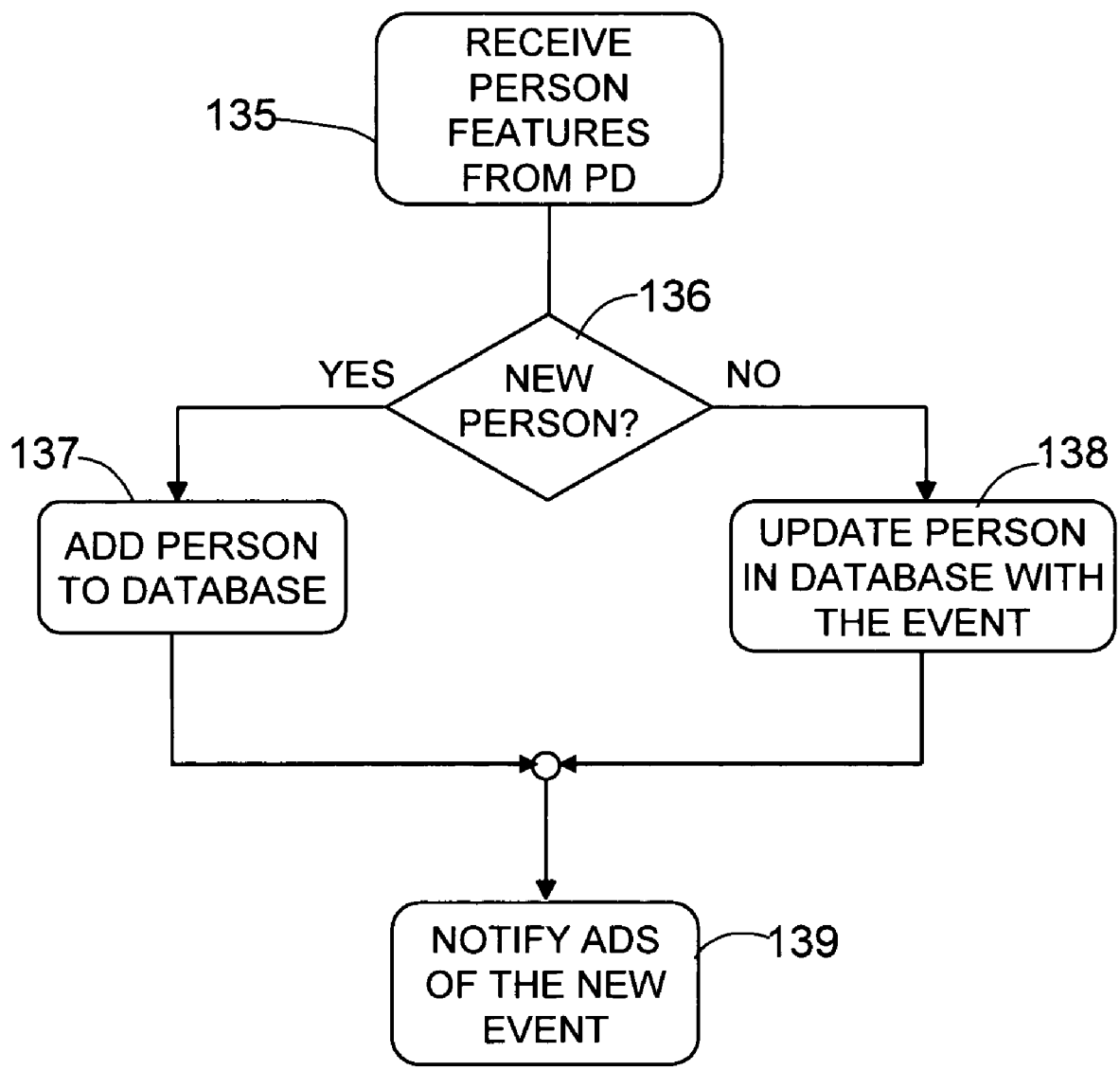
FIG. 3 shows a block diagram of processes in an exemplary person recognizer.

FIG. 3 shows a block diagram of processes in an exemplary person recognizer. In an exemplary embodiment of the invention, FIG. 3 describes one of the exemplary embodiments of the person recognizer (PR) 105. After the features 104 of the detected person are received 135, the PR next determines which person in the person database best matches the newly detected person. The set of features that represent each person is composed into a feature vector. In the exemplary embodiment, a metric can be used (e.g., a dot product or Hausdorff) to determine how well two feature vectors match. The feature vector that provides the best match is chosen. If the value of the comparison with the best match exceeds a predetermined threshold, i.e., not a new person but an existing person in the person database, then the PR updates 138 the person in the person database to update the new event information. If the value of the comparison with the best match does not exceed the predetermined threshold, then the PR adds 137 the newly detected person to the person database. Thus, the statistics of the people who have been influenced or captured by the particular embodiment of the invention can be gathered over a period of time. In either case, the PR notifies the ADS that a new event has occurred 139.

Figure 4:
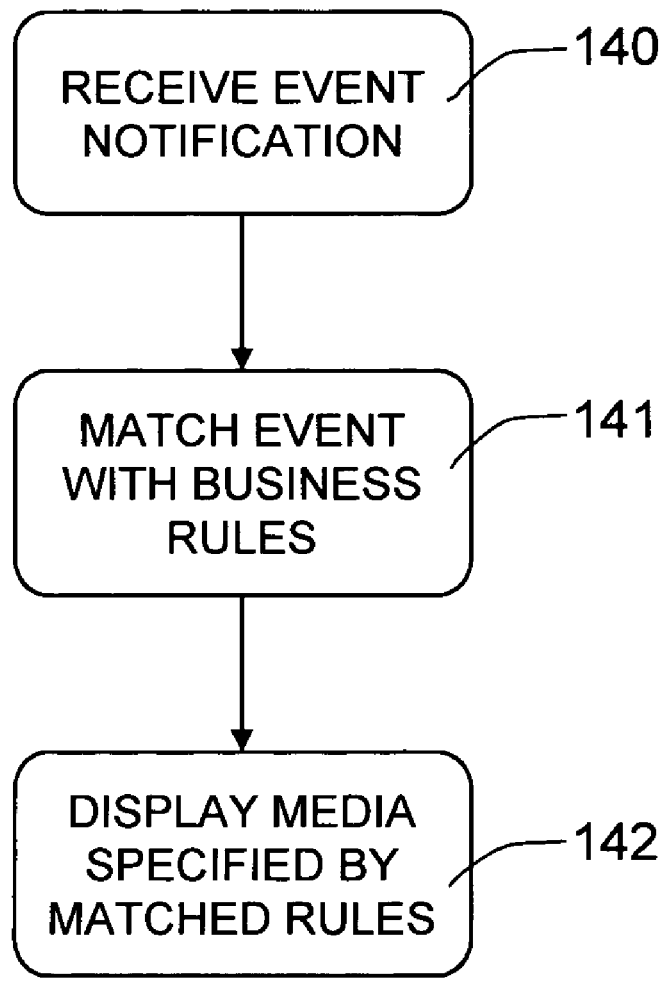
FIG. 4 shows a block diagram of an exemplary Ad server.

FIG. 4 shows a block diagram of an exemplary Ad server. In an exemplary embodiment of the invention, FIG. 4 describes one of the exemplary embodiments of the ADS. After the notification of a new event is received 140, the event is then compared to the antecedent (i.e., the "if" part) of each business rule 141. The consequence (i.e., the "then" part) of the rule whose antecedent matches the newly acquired event is used. The consequence will determine what targeted media will be displayed on the digital display 142.

Figure 5:
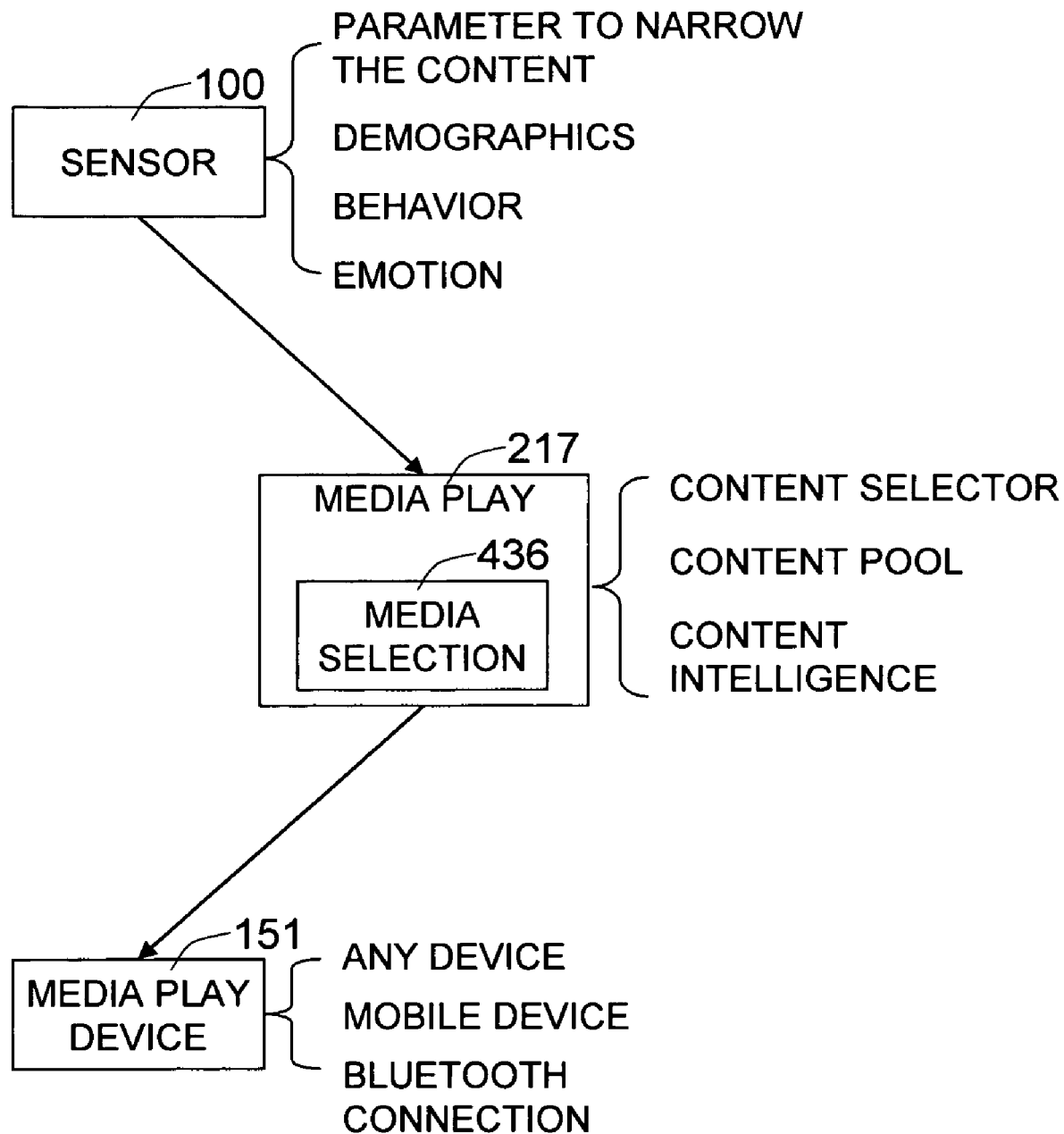
FIG. 5 shows exemplary key modules of the process in the present invention.

FIG. 5 shows exemplary key modules in the present invention. In another exemplary embodiment, there are three key modules involved in the present invention—a sensor 100, a media (content) play 217 and media selection 436 module, and a display device 151. In an exemplary embodiment, a media player 150 can process the tasks for the media (content) play 217 and media selection 436 module. The sensor captures the audience profile based on visibly identifiable traits, such as demographics, emotional state, and behavioral history. This information is sent to the media (content) play 217 and media selection 436 module, which selects the content that is most likely to engage the audience. This content is transferred to the media play device 151, which distributes the content to the audience.

Figure 6:
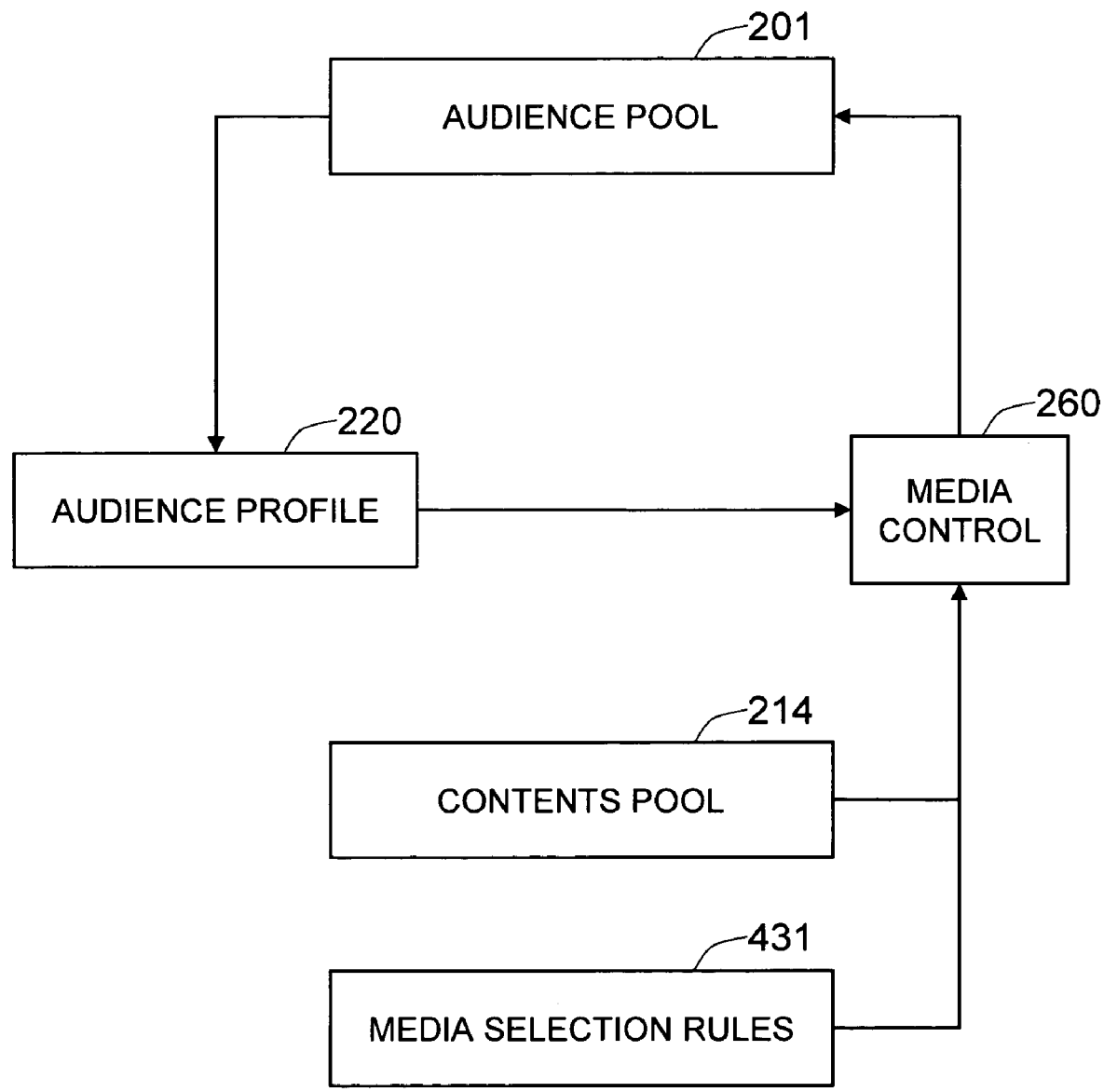
FIG. 6 is an overall scheme of the system in an exemplary embodiment of the present invention.

FIG. 6 shows an overall scheme of the system in an exemplary embodiment of the present invention. From another perspective, the scheme shows an exemplary embodiment of the key processes in the present invention without media response.

In this embodiment, the system consists of five elements—an audience pool 201, a contents pool 214, an audience profile 220, media control 260, and media selection rules 431. In this embodiment, the system aims to deliver media content to an audience based on their profile, such as demographics categories, shopping histories, and emotional states. More specifically, audience profile 220 is measured automatically from the audience pool 201, based on their perceptible attributes such, as facial appearance or shopping history. The media control 260 then utilizes the measured audience profile 220 to select the appropriate media content from the contents pool 214 to match the profile. In this embodiment, the media control 260 has predetermined rules, e.g., media selection rules 431, which match media content to a given audience.

Figure 7:
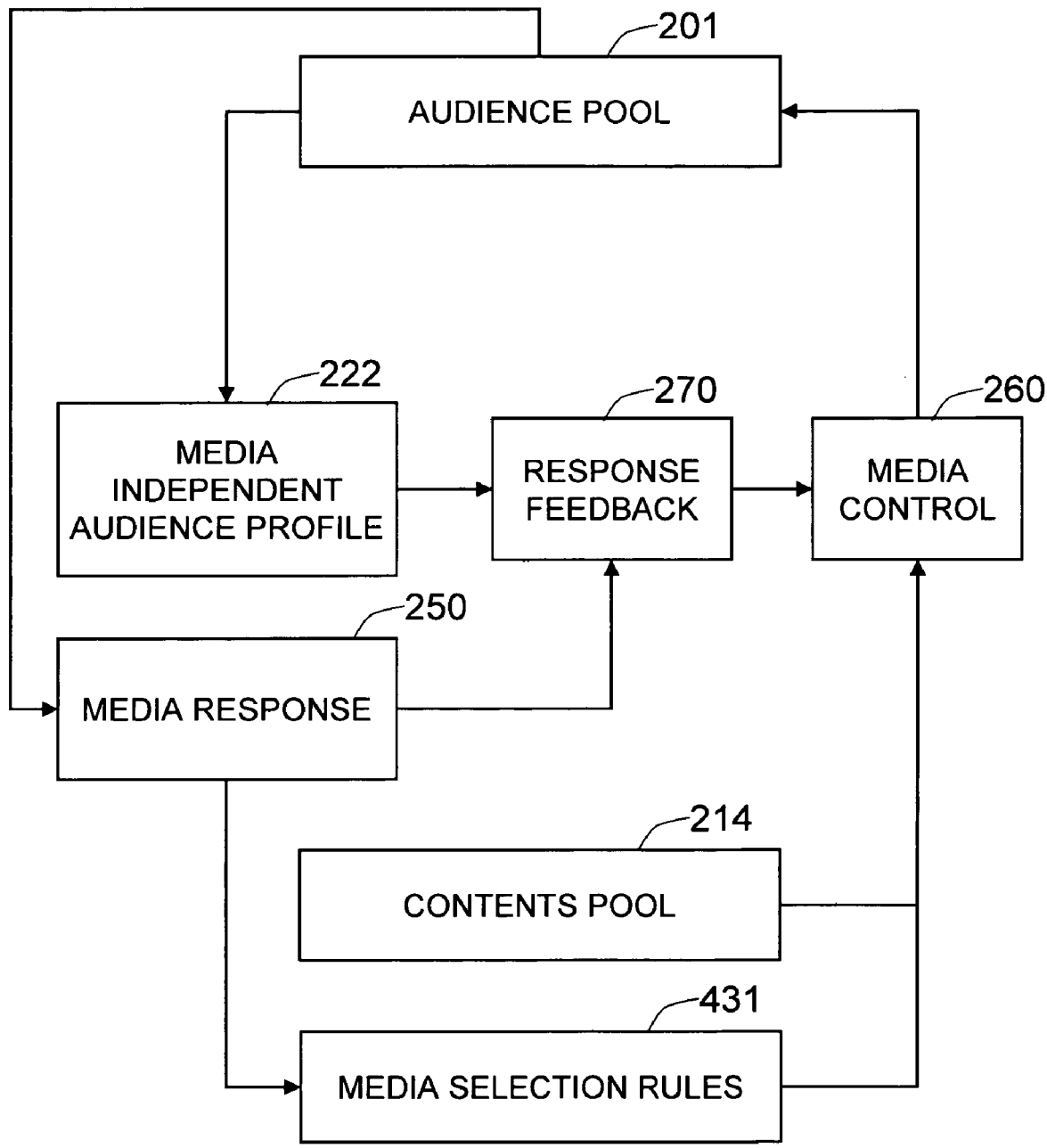
FIG. 7 is an overall scheme of the system in another exemplary embodiment of the present invention.

FIG. 7 shows an overall scheme of the system in another exemplary embodiment of the present invention. From another perspective, the scheme shows an exemplary embodiment of the key processes in the present invention with media response.

In this embodiment, the system consists of seven elements—an audience pool 201, a contents pool 214, a media-independent audience profile 222, media response 250, response feedback 270, media control 260, and media selection rules 431. In this embodiment, the system contains media response 250 and response feedback 270 as system elements, in addition to the elements specified in FIG. 6.

In this embodiment, the media control 260 still functions to select media content 211 from the contents pool 214 that is customized to the audience 200. However, unlike the previous embodiment, media control 260 does not just use a fixed set of rules to select the media content 211; an additional response feedback 270 provides media response 250 information from the audience to the media control 260. The response feedback 270 will modify the rules, so that the media response 250 toward the correspondingly customized media content can be improved. For example, the media selection rules 431 can be modified.

Figure 8:
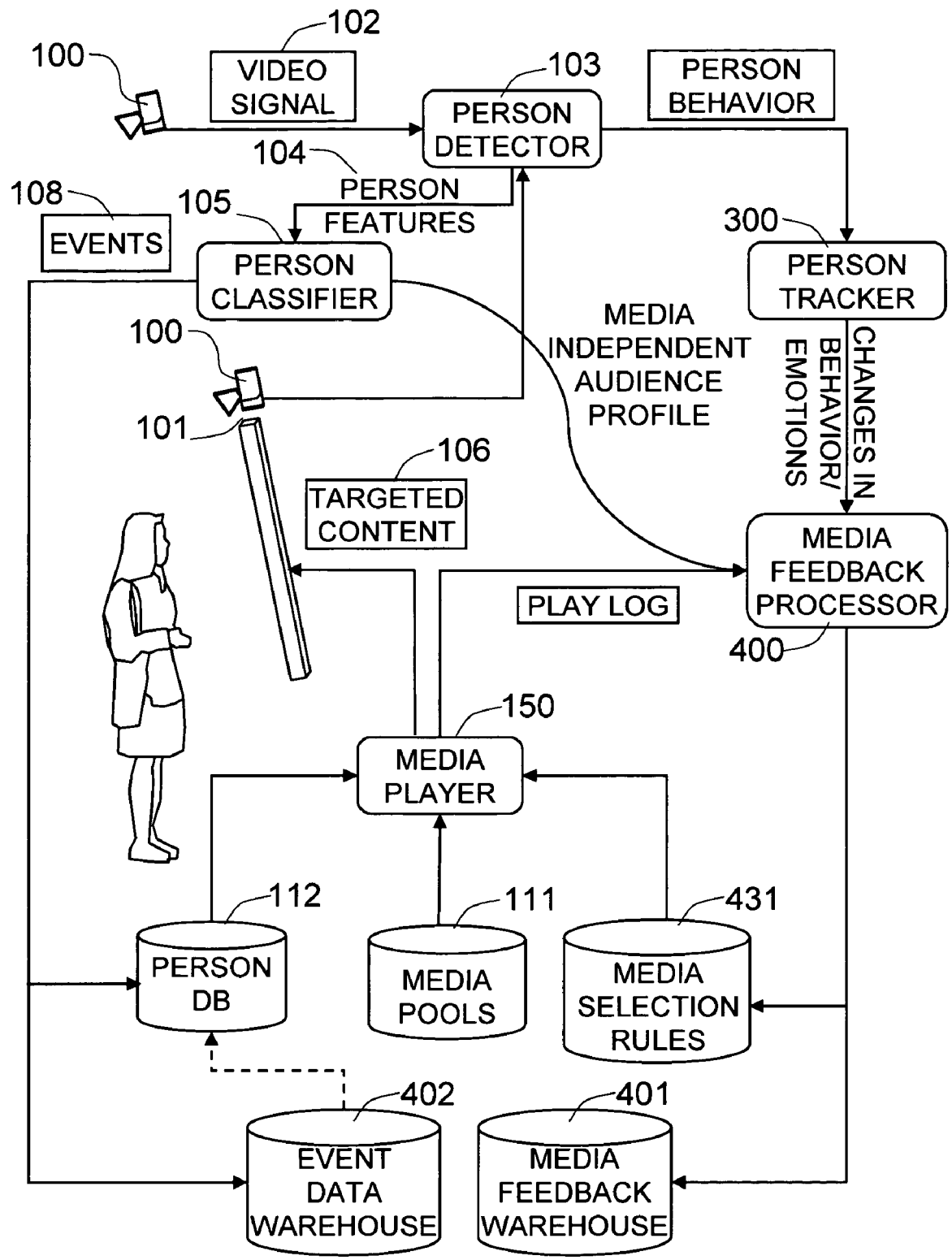
FIG. 8 shows an exemplary embodiment of single place-based media in the present invention.

FIG. 8 shows an exemplary embodiment of single place-based media (PBM) with the present invention. The schematic shows various modules included in the system of the present invention, and the data flow among them.

In this exemplary embodiment, a sensor, e.g., a camera 100, sends video to the person detector 103, which analyzes the video stream and identifies each person in the audience. It sends information regarding person features and historical behavior data to the person classifier 105, which identifies the audience segment and sends the information to the person database (DB) 112, media feedback processor 400, and event data warehouse 402. Another sensor can also be installed in a close proximity to the media play device in this exemplary embodiment. The image data from this sensor can be used for the processes that require a closer view of the audience.

The event data warehouse 402 is a large database that archives all audience segmentation data, if the person DB 112 cannot be refreshed for some reason; the predicted audience profile from the warehouse is populated into the person DB 112.

The person detector 103 tracks the person continuously and sends behavior data to the person tracker 300. The person tracker 300 tracks the changes in behavior, such as change in emotions, dwell time, impression duration, etc., during and immediately after the content is played. It then sends the behavioral data to the media feedback processor 400.

The media feedback processor 400 gathers a media-independent audience profile from the person classifier 105, media response data from the person tracker 300, and play log data from the media player 150, and then associates the three types of data to compute the media selection rules 431 that assign weights to each content, depending on which audience segment positively responded to a specific content. This data is then sent to a database for the media selection rules 431 and to the media feedback warehouse 401.

The media player 150 reads the media-independent audience profile from person DB 112, identifies the media selection rule for that segment from the media selection rules 431, and selects the right content from the media pools 111. It sends the content to the media play device, e.g., a digital screen 101, and the playlog data to the media feedback processor 400.

The person DB 112 is a temporary database associated with the media player 150, which stores the latest audience profile for which the media player 150 has to play the content. The media pool is the set of content from which the media player 150 selected the media. It may be updated periodically by the network administrator or by automated processes. The media selection rules 431 are the rules in a database that associate content with the audience profile and help the media player 150 select the appropriate audience.

Figure 9:
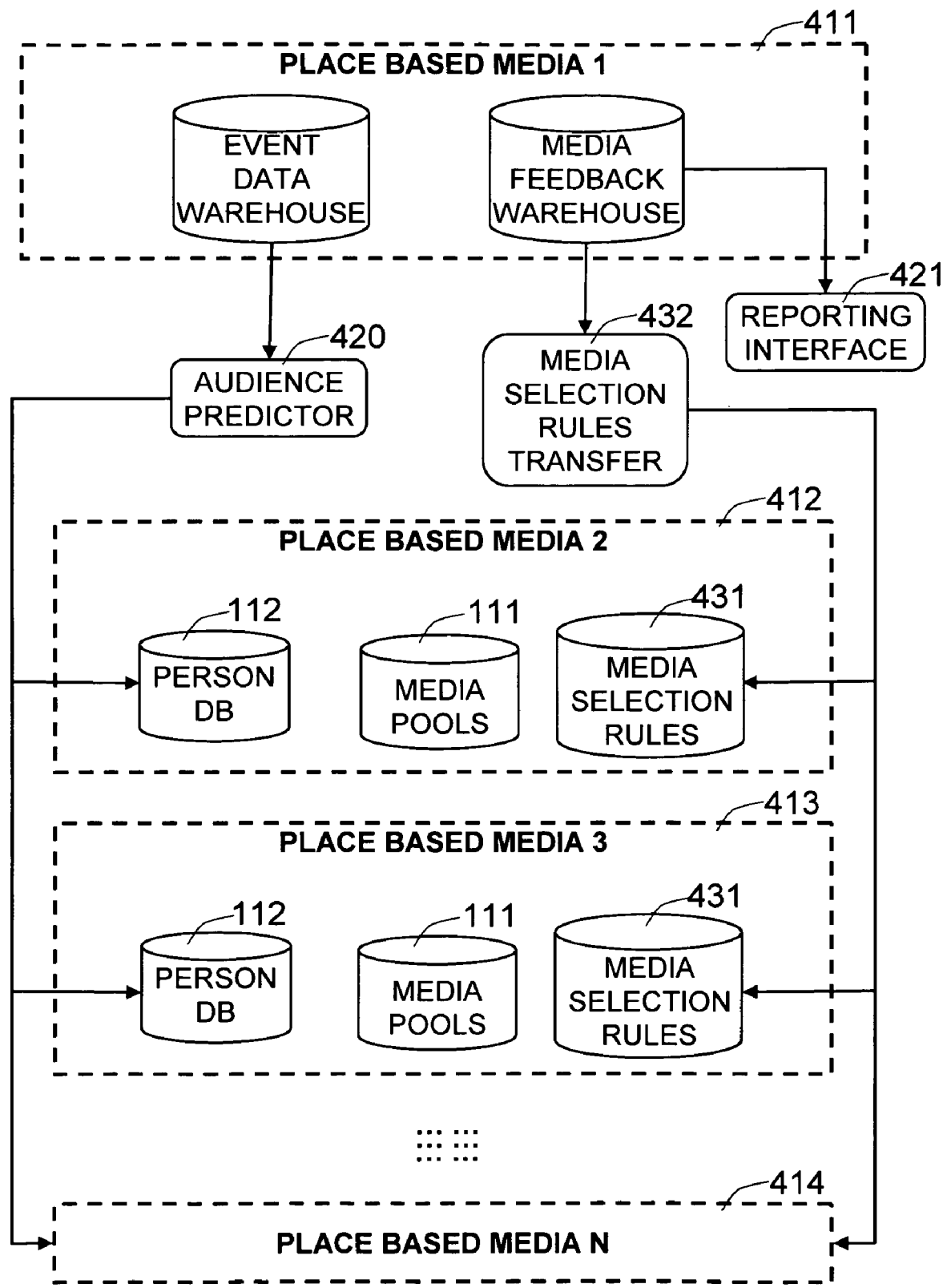
FIG. 9 shows an exemplary embodiment of processing multiple place-based media with a single embodiment of the present invention.

FIG. 9 shows an exemplary embodiment of processing multiple place-based media play with a single embodiment of the present invention. One-to-one association between place-based media (PBMs) and sensors is not necessary in every implementation, although each PBM must have its own person DB 112, media pools 111, and media selection rules 431 DB.

The present invention can support multiple PBMs from one sensor. In such a scenario, the PBMs that have associated sensors can "dynamically narrowcast" content based on live audience information. The PBMs that do not have associated sensors can "passively narrowcast" content based on predicted audience composition.

The audience predictor 420 analyzes the data in event data warehouse to predict the audience profile based on historical trends. This predicted audience data is periodically updated into the person DB of associated PBMs.

The "media selection rules transfer" 432 reads the audience feedback data from the media feedback warehouse, and generates generic media selection rules. These media selection rules are updated to the media selection rules of the associated PBMs.

The reporting interface 421 allows analysts to access the media feedback warehouse and further analyze the data for custom requirements.

Figure 10:
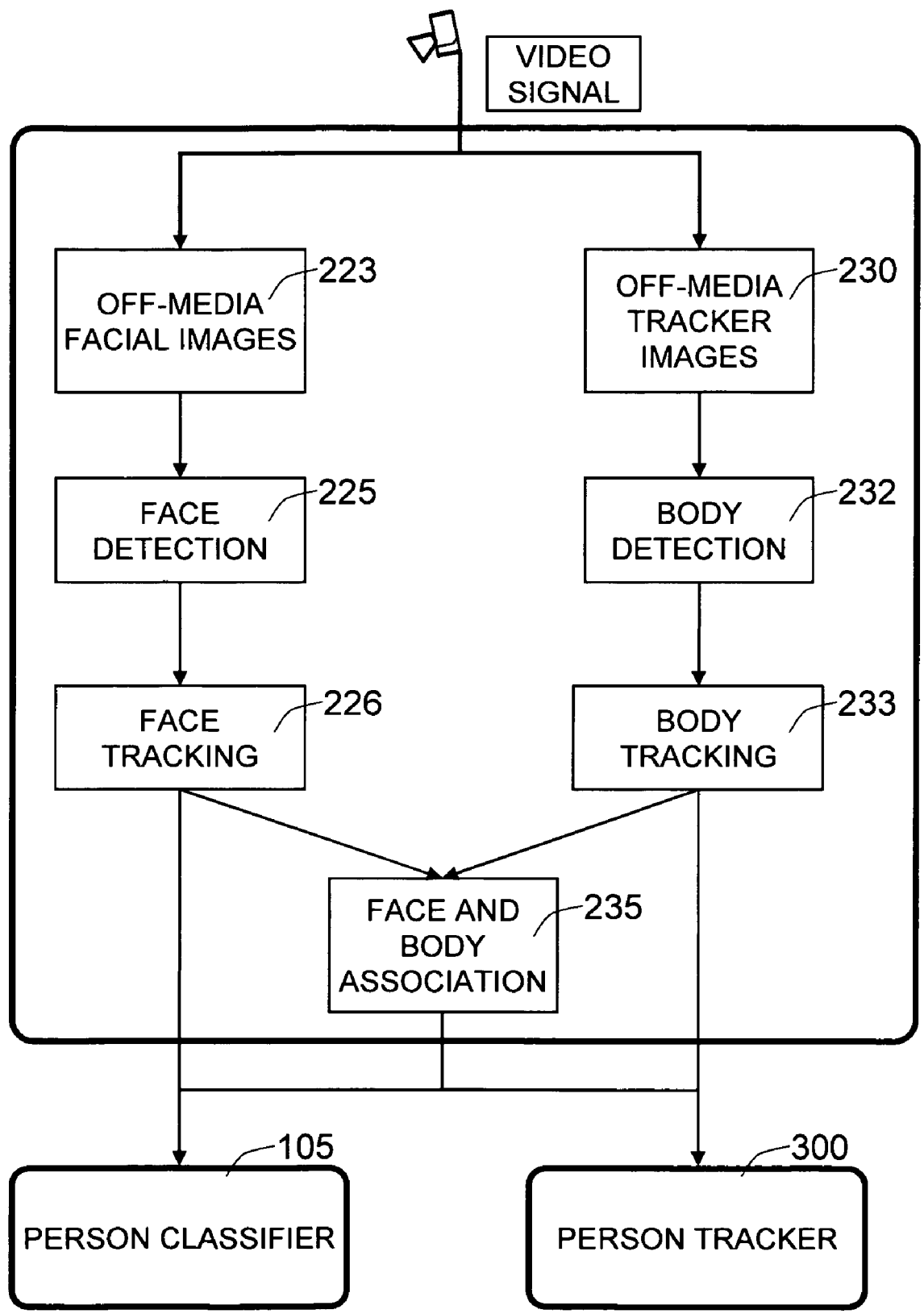
FIG. 10 shows an exemplary embodiment of a person detector module.

FIG. 10 shows an exemplary embodiment of a person detector module.

In this exemplary embodiment, the person detector processes the incoming video signal along the two paths shown. It detects 225 the face of a person and tracks 226 it from the off-media facial images 223 in one path. It also detects 232 the body of the person and independently tracks 233 it from the off-media tracker images 230 in another path. The two types of tracking data are associated 235 to capture a complete profile of the person. The data is then transferred to a person classifier 105 and a person tracker 300.

Figure 11:
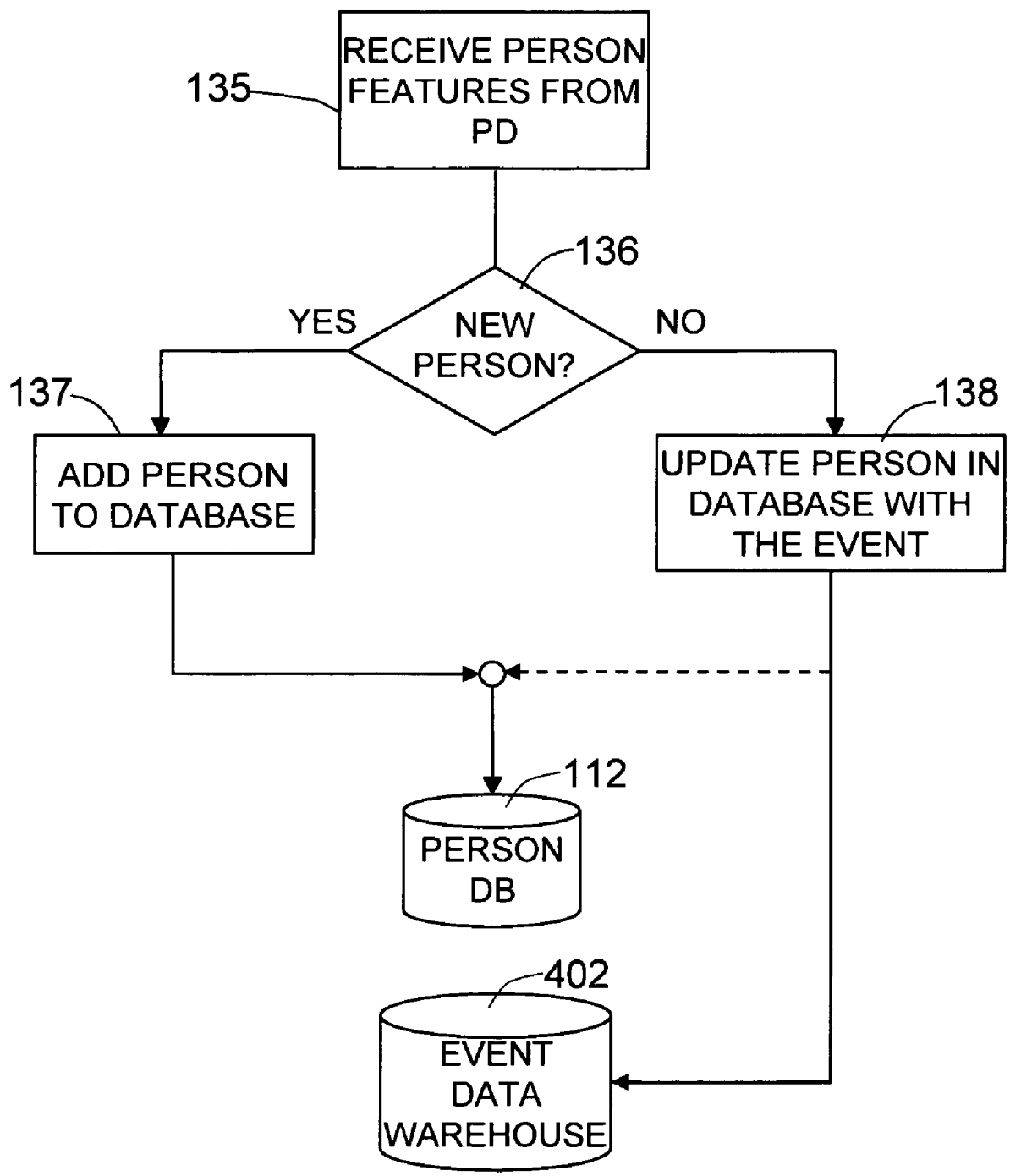
FIG. 11 shows exemplary processes in another exemplary person recognizer.

FIG. 11 shows exemplary processes in another exemplary person recognizer (PR).

The person classifier continuously receives 135 data from the person detector. After the features of the detected person are received 135, the PR next determines which person in the person database best matches the newly detected person. The set of features that represent each person are composed into a feature vector. In the exemplary embodiment, a metric can be used (e.g., a dot product or Hausdorff) to determine how well two feature vectors match. The feature vector that provides the best match is chosen. If the data is for an existing person, then the data for the existing person in the person DB is updated 138 with the event. If the data is for a new person, then the person is added to the person DB 112, and the event data warehouse 402 is updated accordingly. The statistics of the people who have been influenced or captured by the particular embodiment of the invention can be gathered over a period of time. In either case, the PR notifies the next processing modules, such as the person classifier 105 and the person tracker 300, that a new event has occurred 139.

Figure 12:
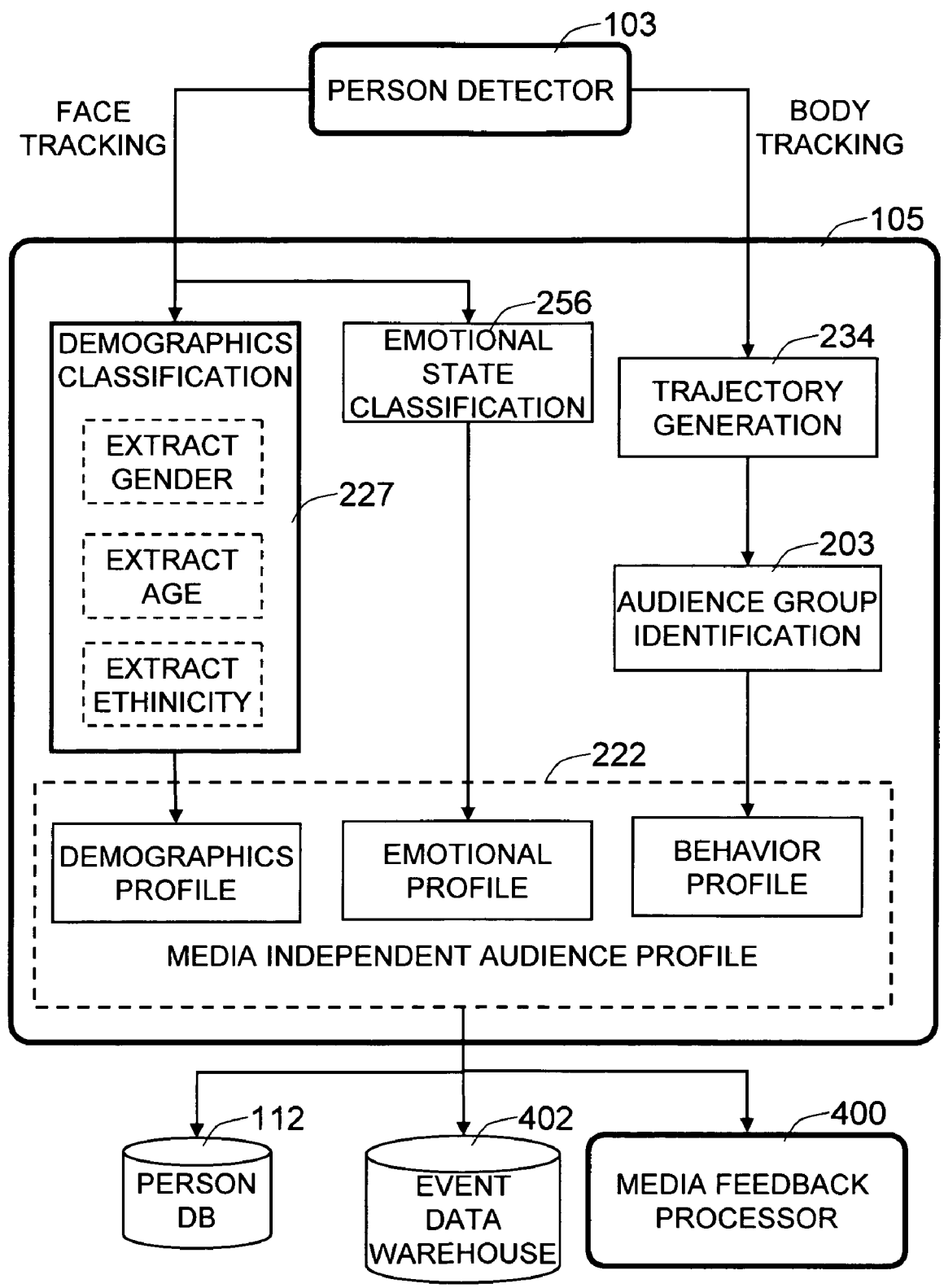
FIG. 12 shows an exemplary embodiment of a person classifier module.

FIG. 12 shows an exemplary embodiment of a person classifier 105 module.

In this exemplary embodiment, the person classifier classifies a person based on three dimensions—demographics, emotional state, and historical behavior. It is important to note that this information is based on the analysis of the person's face tracking and body tracking data up to the point at which the person comes close to the PBM. It generates the media-independent audience profile, which is used to identify the most relevant content. The profile includes information regarding the demographics, emotional state, and behavioral history of the audience member. If more than one person is detected in the vicinity, then they can be identified as a group. Their individual profiles can be merged to form a group profile for media selection.

When the values of the attributes by the individual profiles in the group profile conflict, the media selection for a group profile can be processed based on a predefined group profile decision rule among the conflicting attribute values. An exemplary group profile decision rule is a majority rule, where the majority values of attributes represent the group profile. For example, the gender attribute can be one of the exemplary attributes that is gathered for the group profile, and the group may contain some females and males. In this example, the set of aggregated values for the gender attribute will consist of both values, e.g., female and male tags, as values for the gender attribute. If the values of the gender attribute show more female members than male members in the group of people, the gender attribute for the group can be represented by "female," since the majority of people are female, and the media can be customized in such a way to serve women, based on the media selection rule for a female audience. When there is a tie, a tie-breaker rule can also be set up in the group profile decision rule or the media selection rule.

Figure 13:
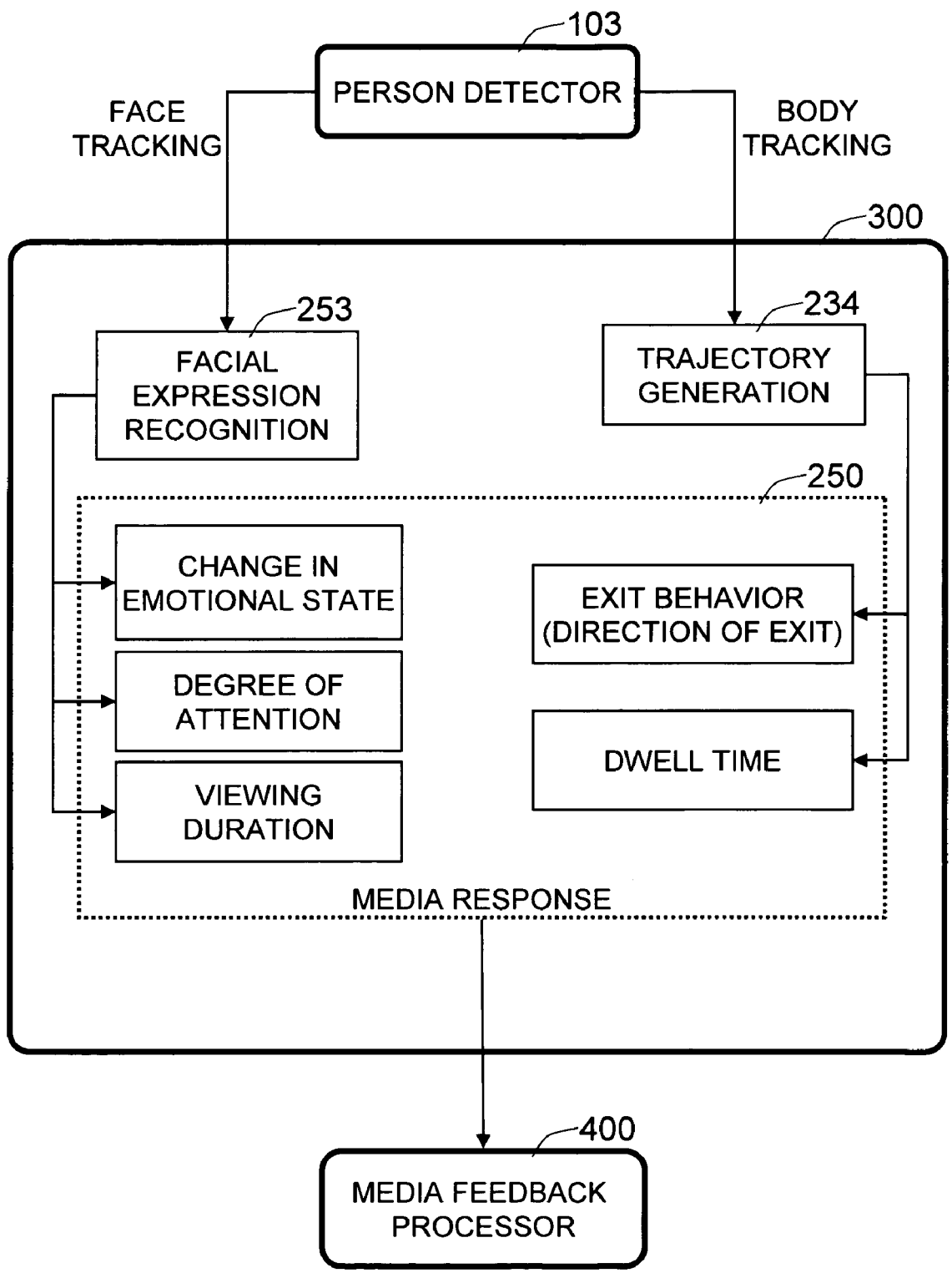
FIG. 13 shows an exemplary embodiment of a person tracker module.

FIG. 13 shows an exemplary embodiment of a person tracker 300 module.

In this exemplary embodiment, the person tracker module tracks a person's behavior during and after the content is played. It collects data over a period of time, and detects the changes (delta) in the audience profile. It collects two types of data—face-based and trajectory-based—which together form the media response 250.

The facial analysis provides data such as change in emotional state, impression duration, etc., and the trajectory analysis provides data such as dwell time in a given region, direction of travel after the media is played, etc.

Figure 14:
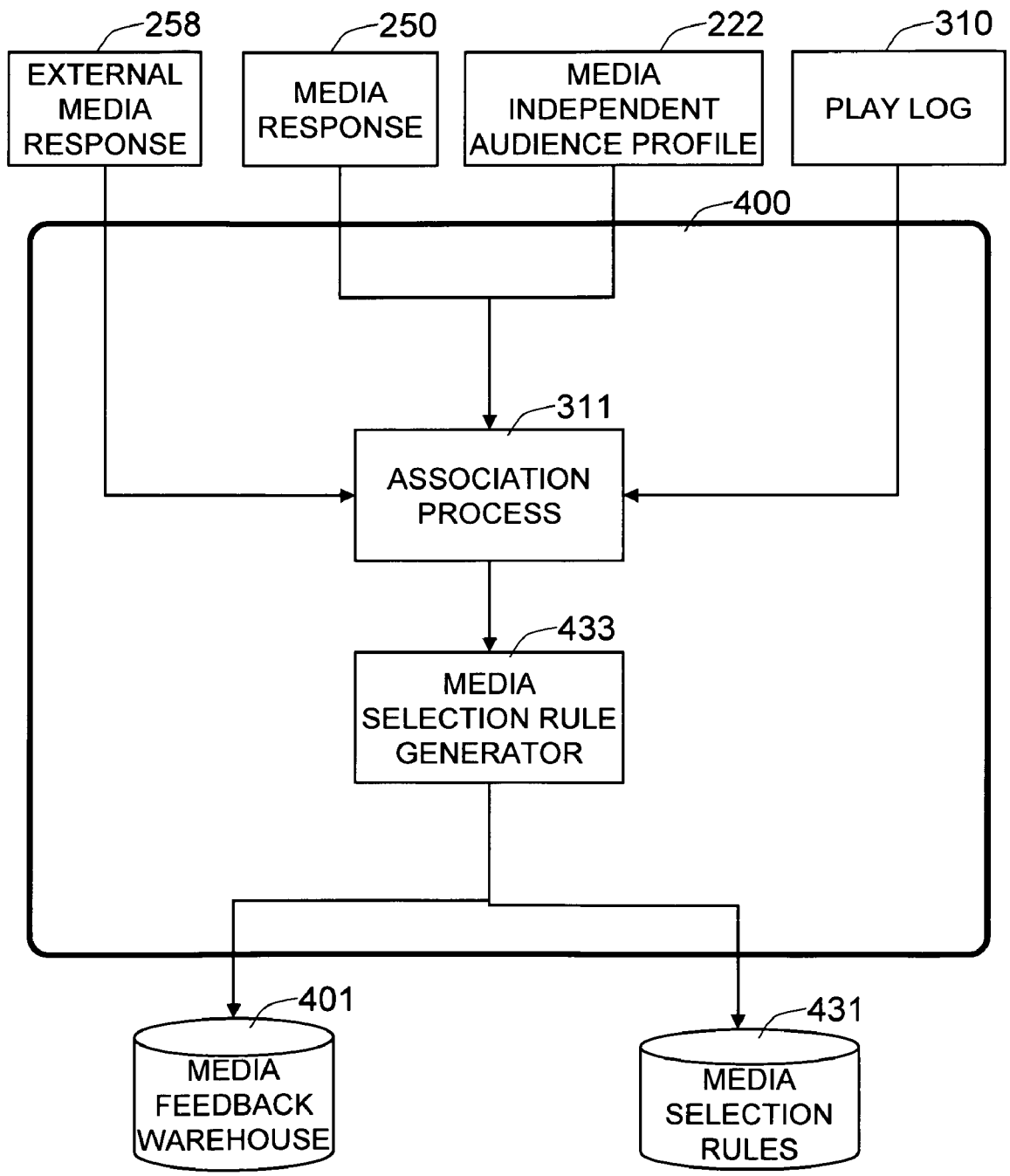
FIG. 14 shows an exemplary embodiment of a media feedback processor module.

FIG. 14 shows an exemplary embodiment of a media feedback processor 400 module.

In this exemplary embodiment, the media feedback processor 400 gathers media-independent audience profiles from the person classifier, media response data from the person tracker, external media response data from any external sources, and playlog data from the media player 150. It associates 311 the four types of data using parameters such as time stamps.

Figure 24:
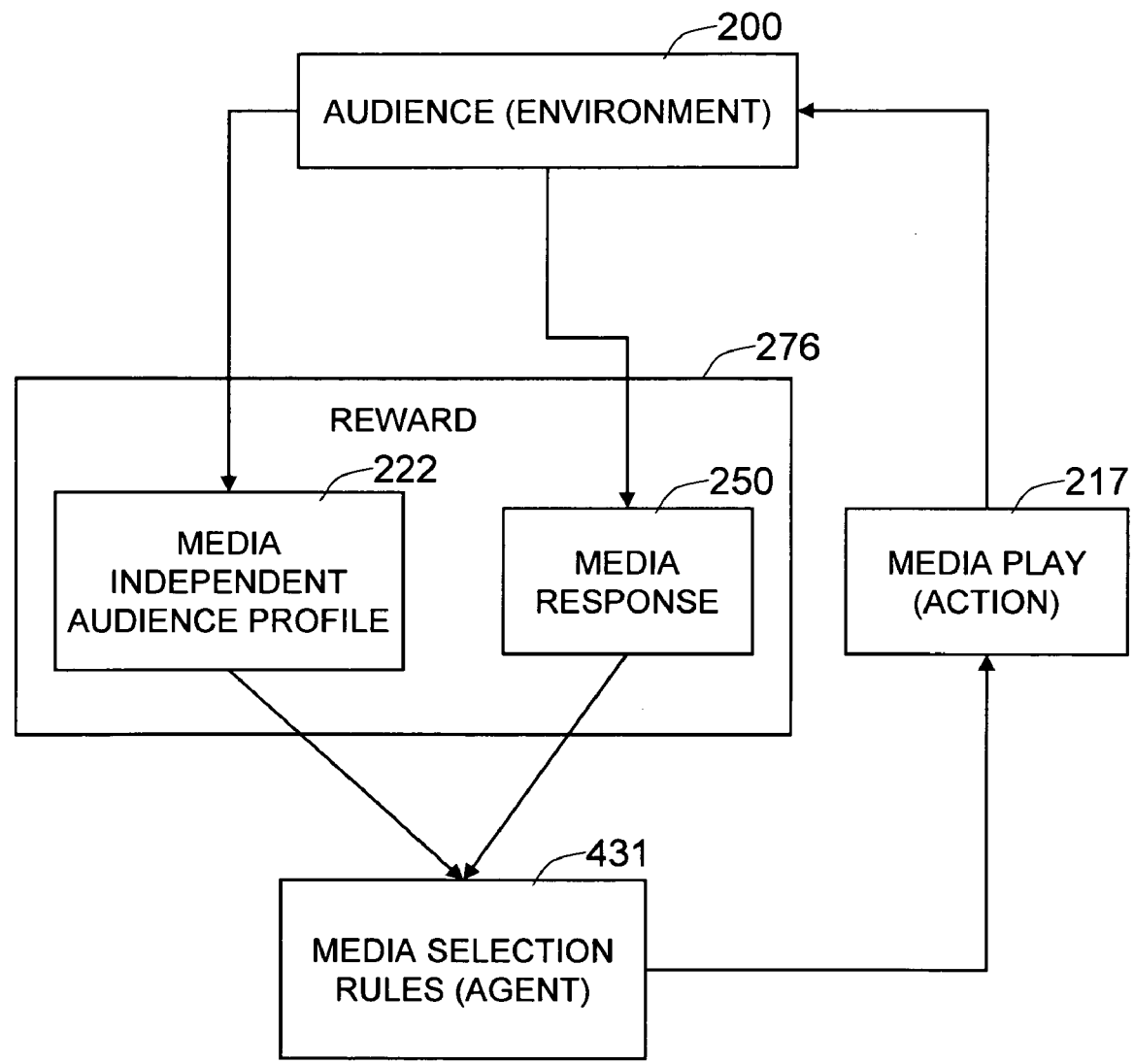
FIG. 24 shows an exemplary embodiment of a response feedback scheme.
Figure 25:
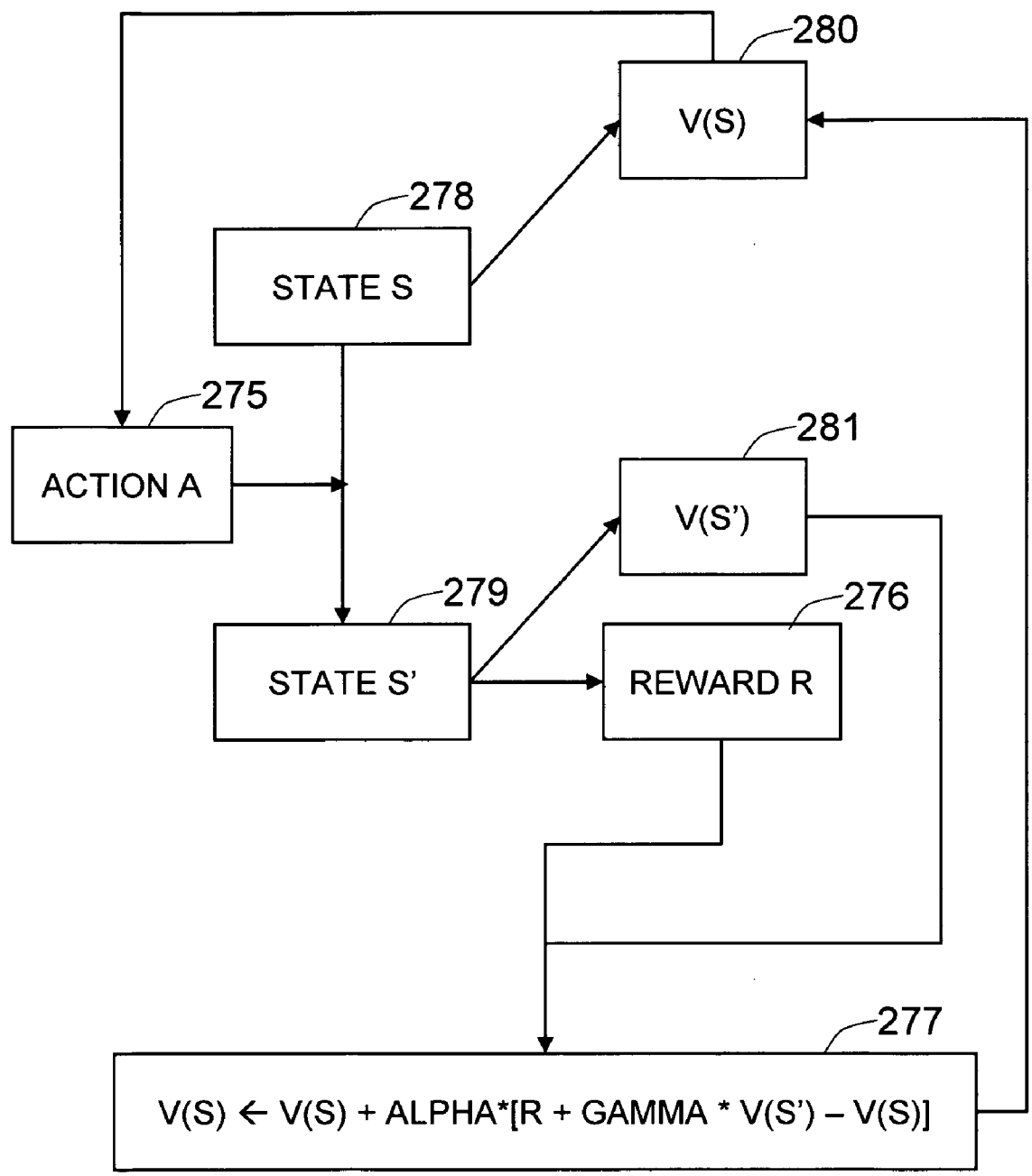
FIG. 25 shows an exemplary embodiment of response feedback.

The media selection rules are computed 433 using a machine learning algorithm, described in FIG. 24 and FIG. 25. These rules are sent to the media selection rules 431 DB and to the media feedback warehouse 401. It is an optional part of the system. If the processor is not included, then the media selection rules can be manually updated.

Figure 15:
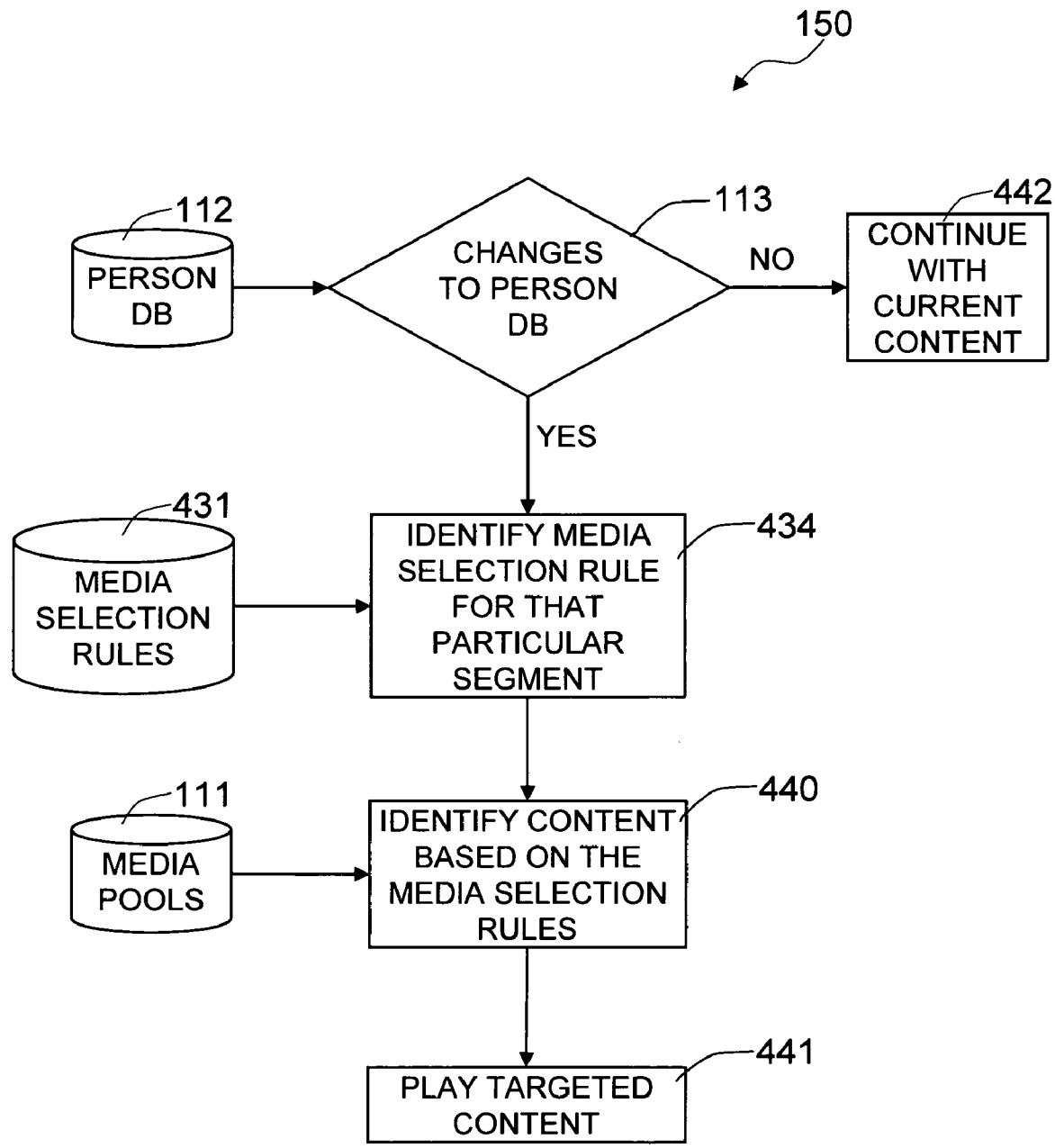
FIG. 15 shows an exemplary embodiment of a media player module.

FIG. 15 shows an exemplary embodiment of a media player 150 module.

In this exemplary embodiment, the media player reads the audience segment information from the person DB 112.

If the data has changed 113, the media player 150 identifies 434 the business rule for that segment from media selection rules, and selects 440 the right content from the media pool. It sends the content to the media play device, e.g., digital screen, and the playlog to the media feedback processor.

If the data in the person DB 112 has not changed, the media player 150 continues 442 with the current content.

Figure 16:
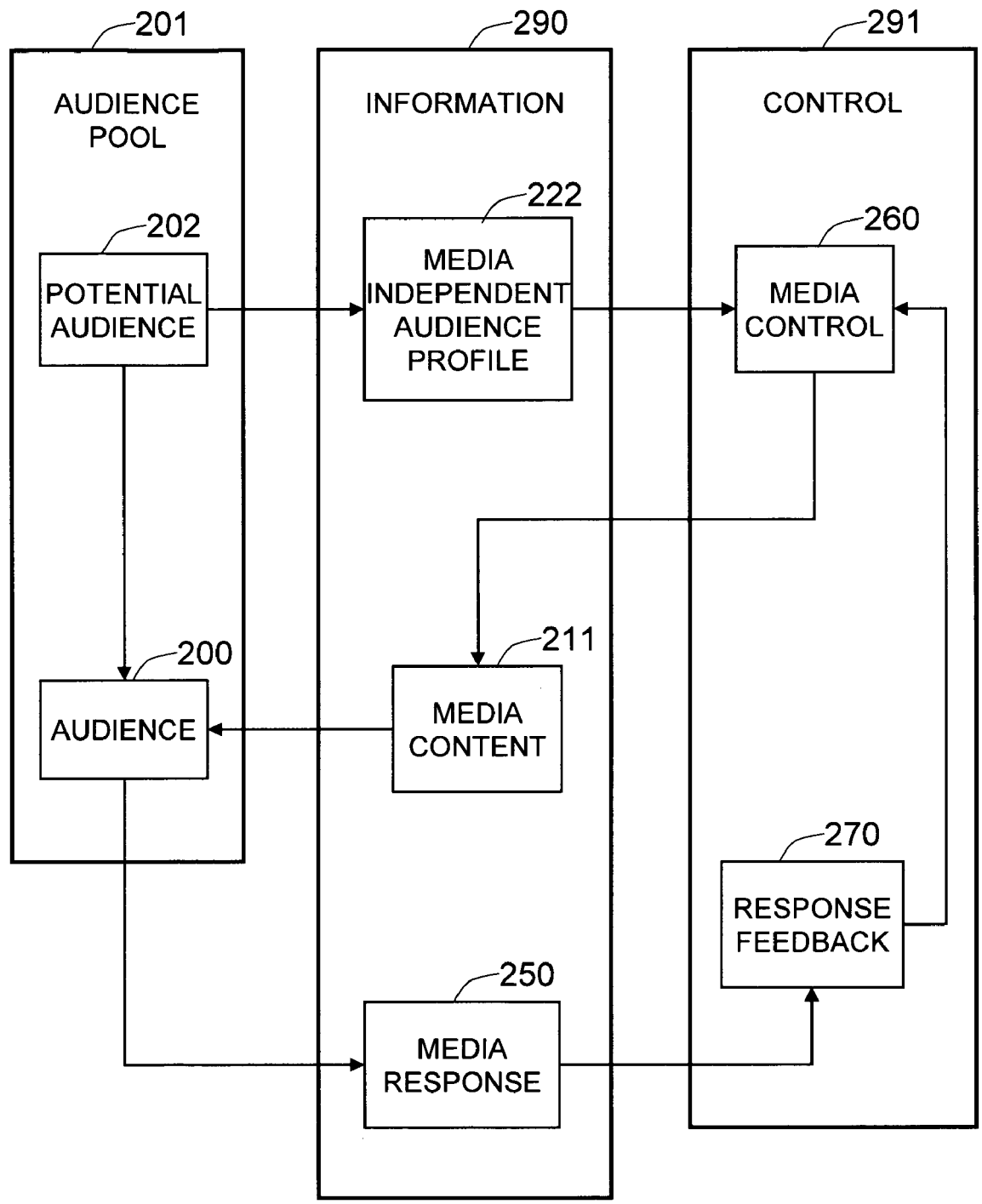
FIG. 16 shows a flow of information between system elements in an exemplary embodiment of the present invention.

FIG. 16 shows a flow of information between system elements in an exemplary embodiment of the present invention. In this example, the embodiment of the present invention consists of three categories—an audience pool 210, information 290, and a control 291. Any customer who has not been exposed to the media comprises the potential audience 202. The media-independent audience profile 222 of the potential audience is measured and sent to the media control 260 module of the control 291. The media independent audience profile 222 comprises gender, age, ethnicity, emotional state, and shopping history. In an exemplary embodiment, the measurement is performed by automatic video analysis. Then the media control 260 determines the media content 211, which is delivered to the audience 200 whenever the audience is available to be exposed to the media content. The media content 211 is delivered by visual media display or audible media play. Then the media response 250 of the audience 200 toward the delivered media content 211 is measured; the system typically utilizes an automatic video analysis to measure the media response 250. The response feedback 270 then analyzes the media response 250 to change the media selection rules 431, so that the media control 260 can improve the media response of the future audience.

Figure 17:
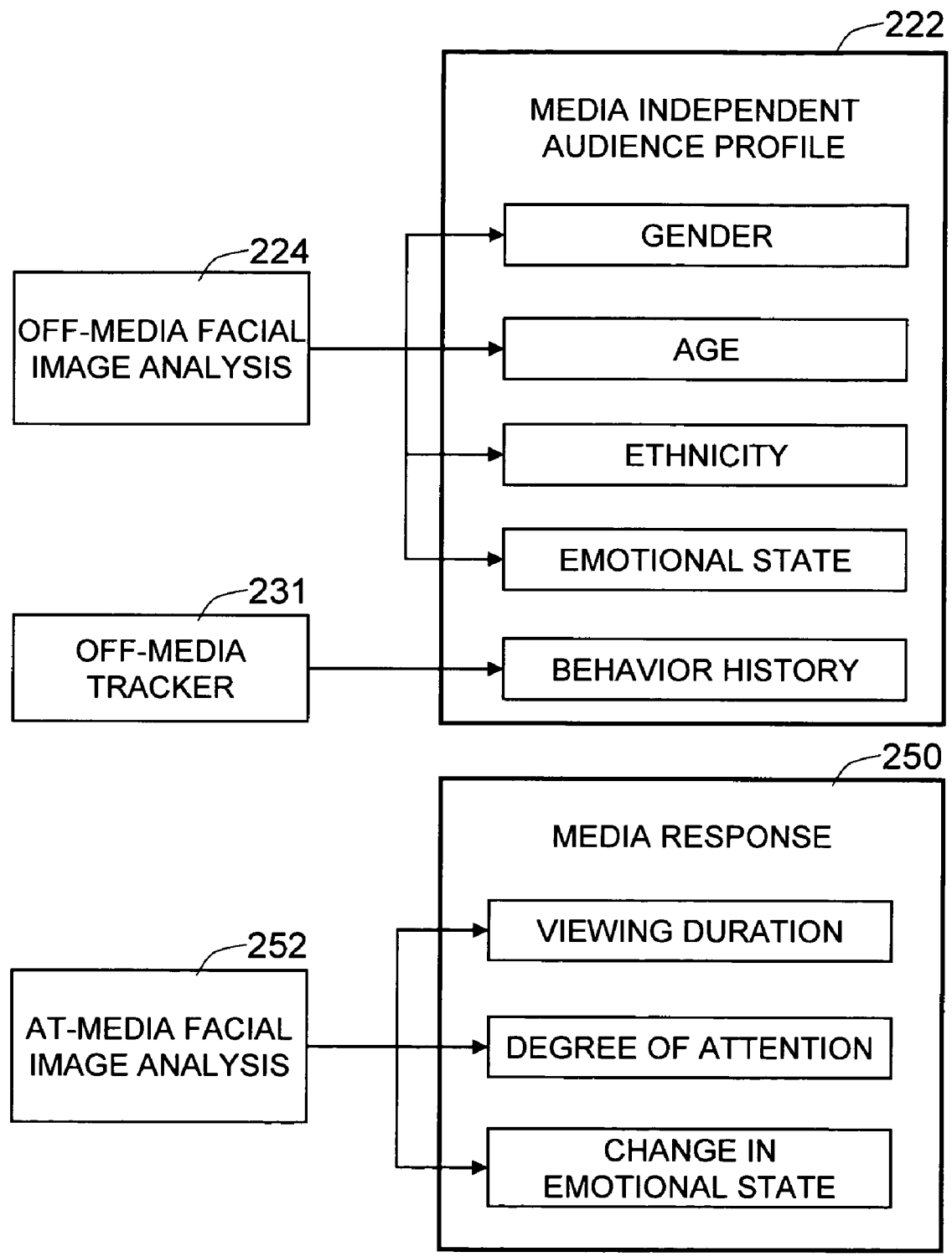
FIG. 17 shows an exemplary measurement method of media independent audience profile and media response.

FIG. 17 shows an exemplary measurement method of the media-independent audience profile 222 and media response 250. In this embodiment, the off-media facial image analysis 224 processes the video images capturing the facial images of the potential audience to generate the gender, age, and ethnicity categories of the potential audience 202. The off-media tracker 231 processes the video images capturing the movements of the audience to generate their tracks, so that their behavior history 245—i.e., which product categories or services the customers have gone through before approaching the media—can be recognized. On the other hand, the at-media facial image analysis 252 processes the video images capturing the facial images of the audience who are being exposed to the media, so that the media response 250 of each person in the audience—i.e., viewing duration 254, degree of attention 255, or emotional state 244—can be measured.

Figure 18:
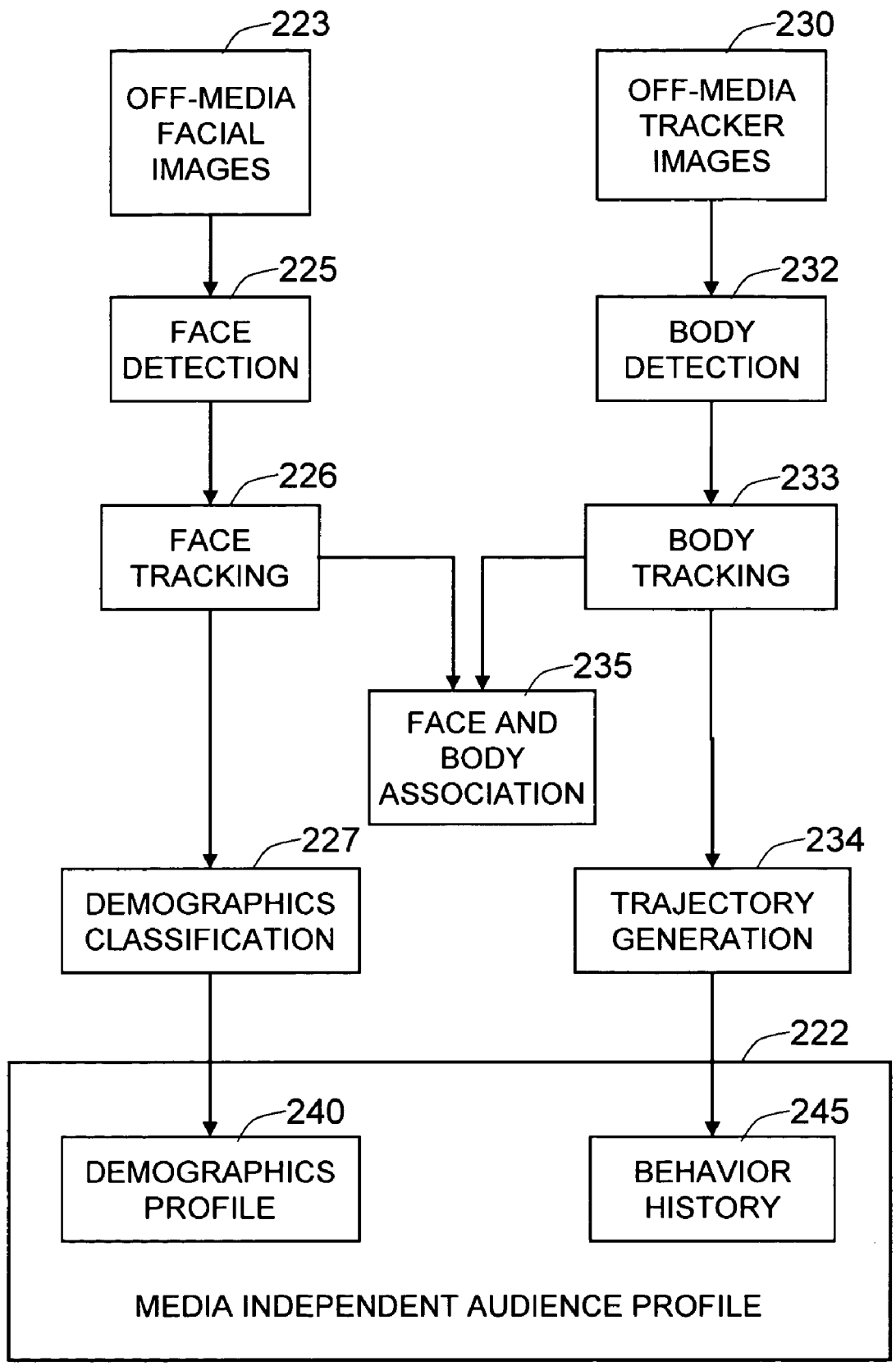
FIG. 18 shows exemplary embodiments of the off-media facial image analysis and the off-media tracker.

FIG. 18 shows exemplary embodiments of the off-media facial image analysis 224 and the off-media tracker 231.

The off-media facial images 223 are taken from camera deployed to capture the facial images of the potential audience 202—the people who have a high chance of being exposed to the media. The face detection 225 step finds any human faces from the images, and the face tracking 226 step individually tracks them. The tracked faces are fed to the demographics classification 227 step, a where demographic profile 240 of the potential audience—such as gender, age, and ethnicity—is determined. The demographics profile 240 is part of the media-independent audience profile.

On the other hand, the off-media tracker images 230 are captured from cameras positioned to capture the movements of the potential audience. The body detection 232 step finds bodies of the audience, and the body tracking 233 step individually tracks them. The trajectory generation 234 step then records the trajectories of the people from the audience. The generated trajectories serve as the behavior history 245—which product categories or services the customers have visited before approaching the media.

The face and body association 235 step makes a correspondence between each of the tracked faces from the face tracking 226 step and each of the tracked bodies from body tracking 233 step, so that the generated demographics profile 240 and the behavior history 245 belong to the same person. The media independent audience profile 222 then comprises the associated demographics profile 240 and behavior history 245.

Figure 19:
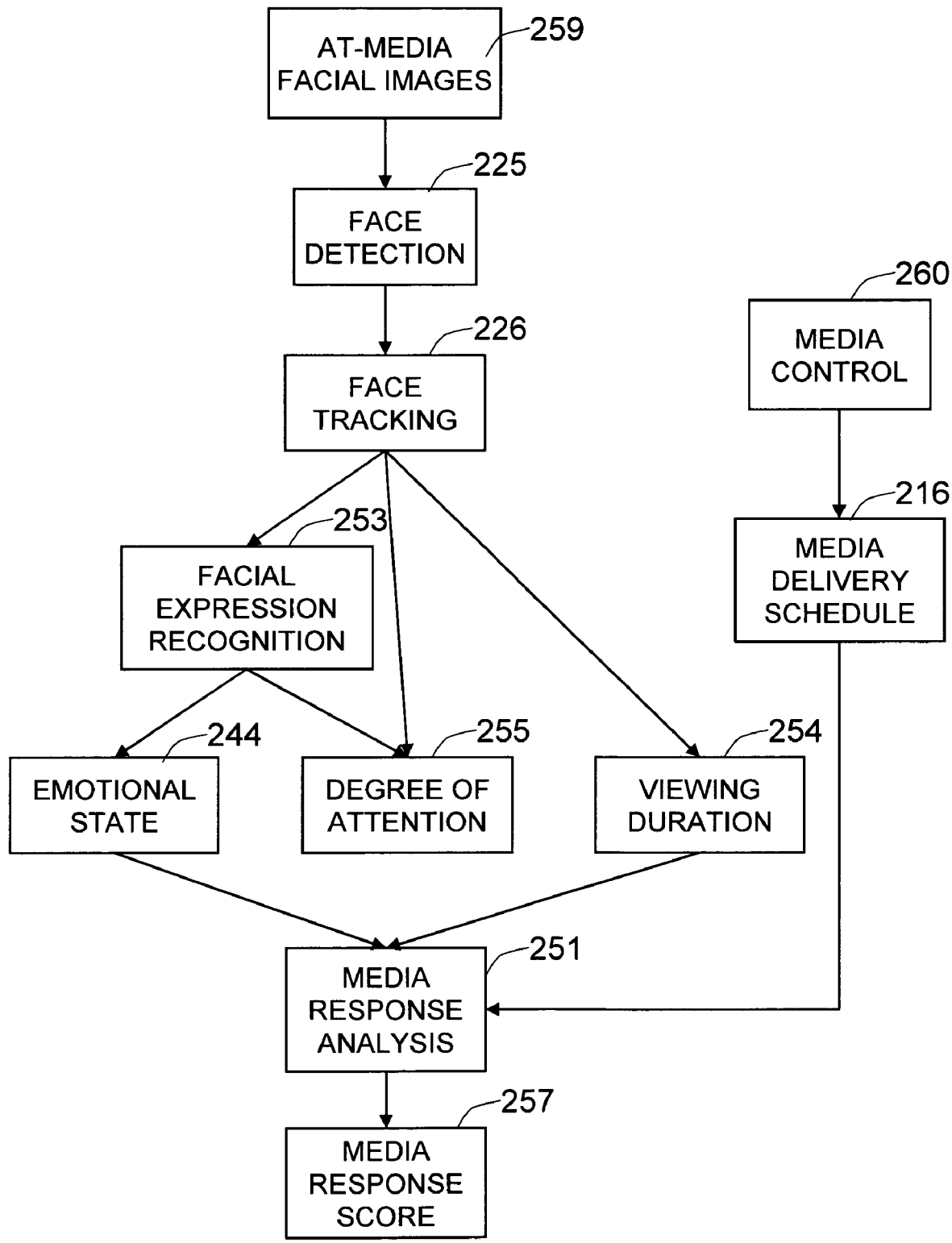
FIG. 19 shows an exemplary embodiment of at-media facial image analysis.

FIG. 19 shows an exemplary embodiment of at-media facial image analysis 252. The at-media facial images 259 are taken from a camera deployed to capture the facial images of the audience 200 being exposed to the media. The face detection 225 step finds any human faces from the images, and the face tracking 226 step individually tracks them and estimates the facial poses. The tracked faces are fed to the facial expression recognition 253 step to recognize the changes in facial features, from which the emotional state of each of person in the audience is estimated. Both the estimated pose from the face tracking 226 step and the recognized facial expression are used to estimate the person's degree of attention 255 to the played media. The viewing duration 254 can also be derived from the estimated facial pose.

In this embodiment, the media response analysis 251 step determines the media response 250 toward the played media based on the estimated emotional state 244, degree of attention 255, and viewing duration 254. The media control 260 maintains the media delivery schedule 216, so that the estimated media response can be associated with the corresponding media content.

The media response analysis ultimately computes the media response in the form of an overall media response score 257 for the played media content, that summarizes its effectiveness by combining the changes in emotional state 244, the degree of attention, and the viewing duration. For example, if the emotional state changed from neutral to positive or if the degree of attention and the viewing duration increased, the resulting media response score should improve.

Figure 20:
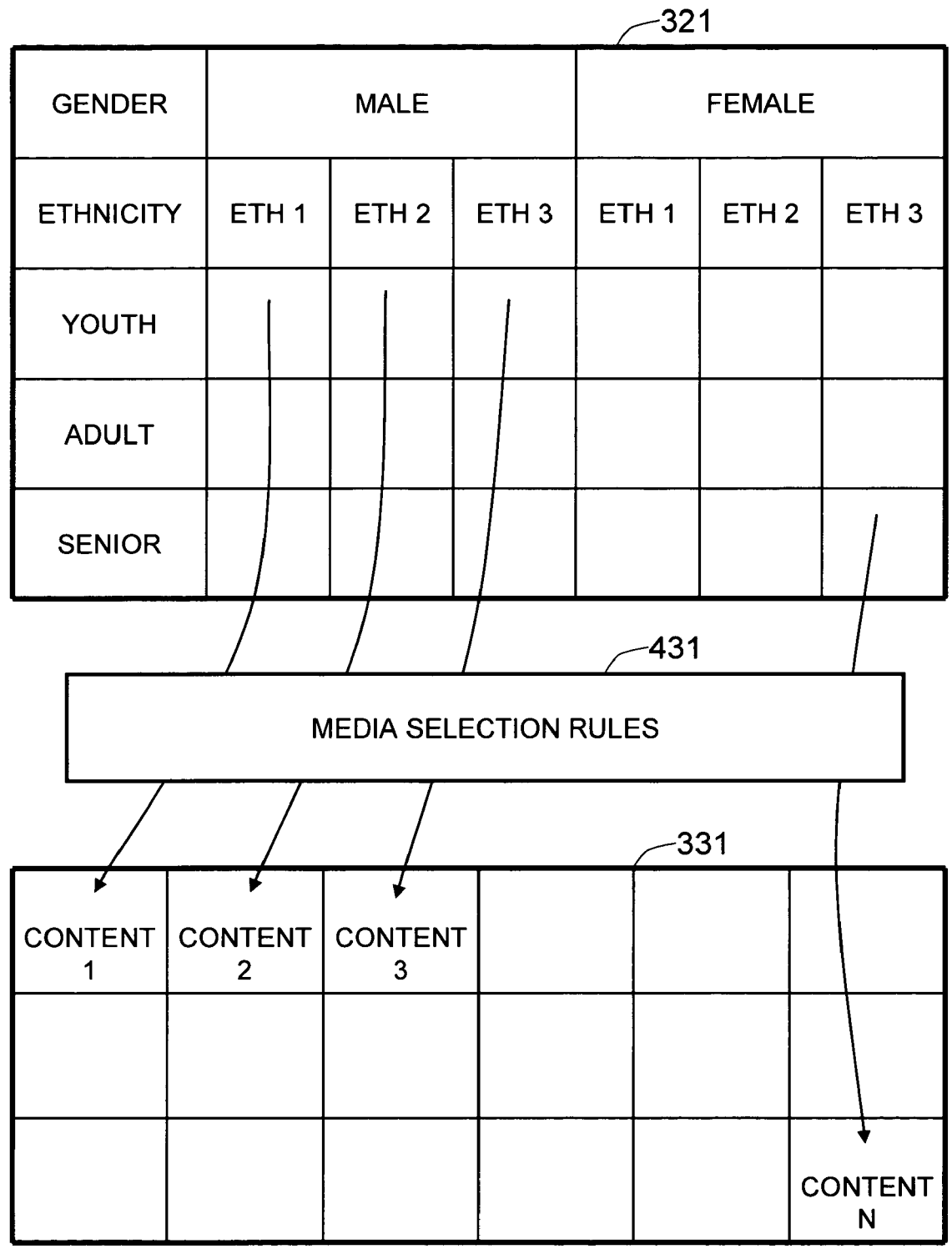
FIG. 20 shows an exemplary embodiment of media selection rules.

FIG. 20 shows an exemplary embodiment of the media selection rules 431. Given a media-independent audience profile 1 321 of a person, the media selection rules 431 aim to choose and play the media content that matches the interest and taste of the person. The exemplary media selection rules 431 shown in the figure have the form of mapping between the demographic classes and the pool of indexed media contents 1 331. For example, when the system determines that the person belongs to the demographic class of male youth of ethnicity 1, the media selection rules choose the content 1.

In one exemplary embodiment, the media selection rules 431 are fixed. In another exemplary embodiment, the media selection rules 431 are modified according to the feedback—such as changes in the emotional states of the audience toward the media content—so that the reception and effectiveness of the media can be improved.

Figure 21:
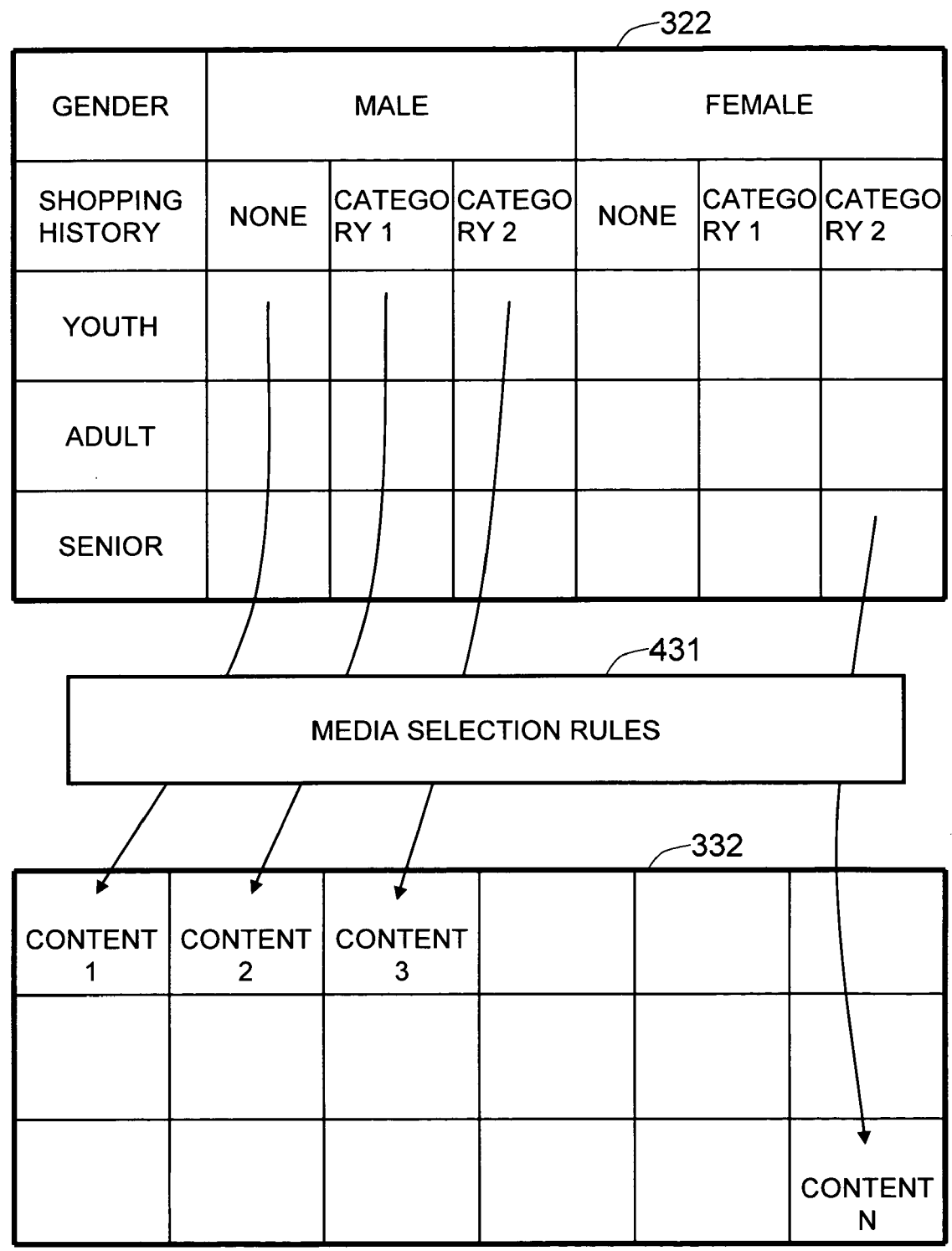
FIG. 21 shows another exemplary embodiment of media selection rules.

FIG. 21 shows another exemplary embodiment of the media selection rules 431. Given a media-independent audience profile 2 322 of a person, the media selection rules 431 aim to choose and play the media content that matches the interest and taste of the person. The exemplary media selection rules 431 shown in the figure have the form of mapping between the media independent audience profiles 2 322 and the pool of indexed contents 2 332. In this embodiment, the media-independent audience profile is defined by the demographic class (gender and age) of the audience and the shopping history of the audience before approaching the media display. The shopping history may be represented by the product category for which that the person last shopped—this information can be measured from the trajectory of the person. For example, when the system determines that the person belongs to the demographic class of male youth who just visited product category 1, the media selection rules choose the content 1.

Figure 22:
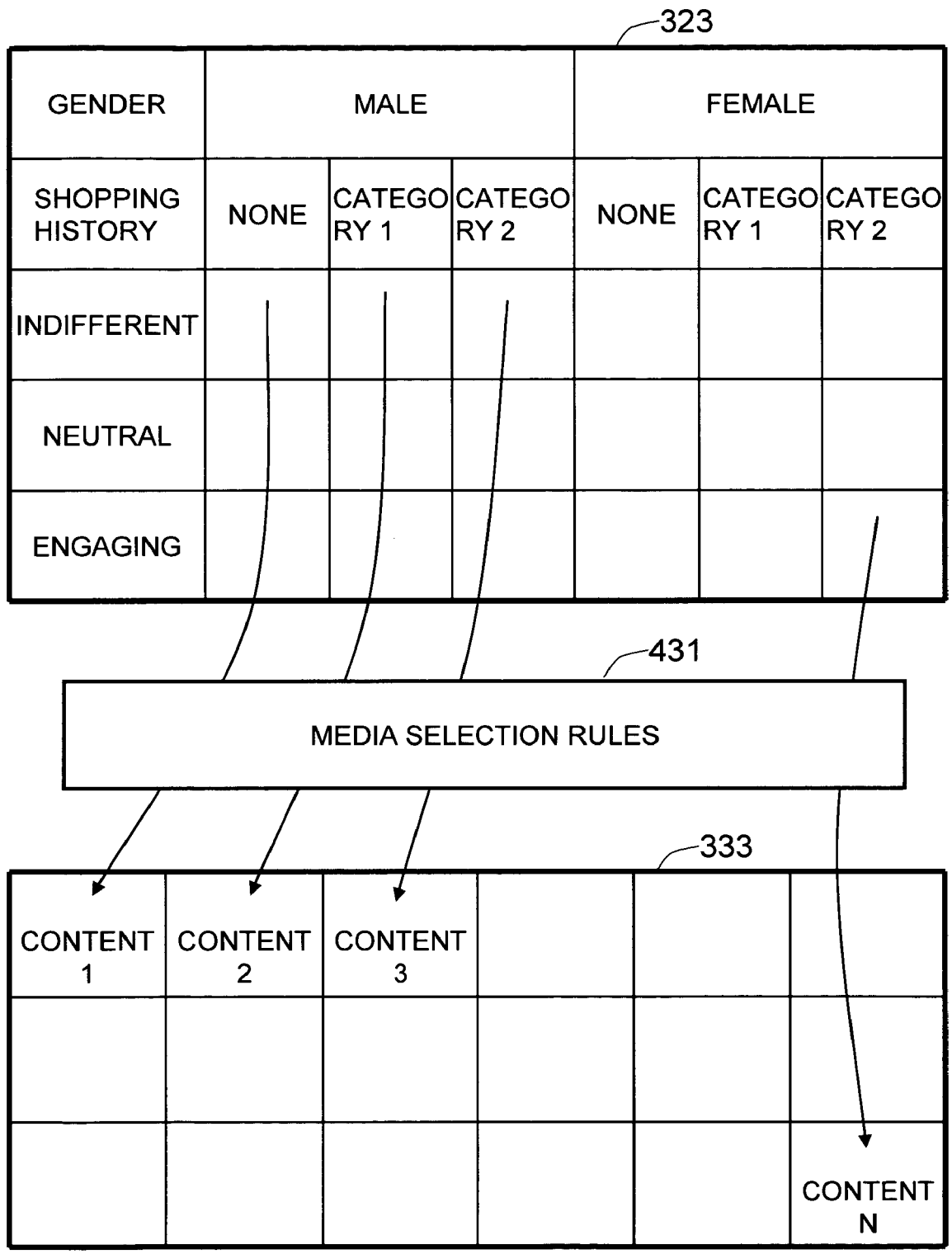
FIG. 22 shows another exemplary embodiment of media selection rules.

FIG. 22 shows another exemplary embodiment of the media selection rules 431. Given a media-independent audience profile 3 323 of a person, the media selection rules 431 aim to choose and play the media content that matches the interest and taste of the person. The exemplary media selection rules 431 shown in the figure have the form of mapping between the media-independent audience profiles and the pool of indexed contents 3 333. In this embodiment, the media independent audience profile is defined by the gender 241, the emotional state 244, and the behavior history 245 of the audience before approaching the media display. The emotional state in this embodiment concerns the degree of engagement or eagerness of the shopper to find certain products. Such information can be measured from the off-media facial image analysis or trajectory analysis. The shopping history may be represented by the product category at which that the person last shopped—this information can be measured from the trajectory of the person. For example, when the system determines that the person is a female who just visited product category 2 showing engaging behavior, the media selection rules choose the content N.

FIG. 23 shows an exemplary implementation of the media selection rules 431. In this embodiment, the media selection rules 431 are given as a table of probability distribution 435. Instead of matching specific media content 211 to a measured audience profile 220, the media selection rules 431 can select media content from a more diverse set of contents based on the measured audience profile. The measured audience profile biases the media selection rules 431, so that more closely-matched content receives higher probability to be selected. Each number in the table represents the probability that a given content may be selected for a given audience profile. For example, the media selection rules select the content 1 with probability 0.6 when the audience has been determined to have the profile 1. If some of the media content is not appropriate for a certain audience—such as children—then the media selection rules can preclude the selection by assigning probability 0.

The scheme can address two issues with media selection. First, there can be more than one suitable content for a given audience profile class, and the scheme just randomize the selection. Second, there is an uncertainly in match between the content and the audiences. The scheme can widen the potential pool of contents for a given audience profile class, and the response feedback 270 mechanism can later modify the audience preference rules.

In one of the exemplary embodiments, the randomization scheme controls the degree of randomness based on the measured response feedback; a higher degree of randomness may be applied at the start, when new contents are added to the content pool, or when there is less consistent audience response.

FIG. 24 shows an exemplary embodiment of a response feedback scheme. In this embodiment, the response feedback 270 takes the form of reinforcement learning 272. Because the goal of the system is to increase the effectiveness of the media by selecting the media content based on feedback from the audience, the media selection scheme can be learned by exploring the possible media selection rules 431 using reinforcement learning. By using the reinforcement learning framework, the training does not depend on any overall judgment about whether or not a given media selection rule worked. The training just requires an immediate feedback—a reward 276—to find globally optimal media selection rules by iteratively performing trial and adjustment based on the reward 276. In this framework, the audience takes the role of environment 273, the media play takes the role of action 275, and the media response takes the role of the reward 276. In the system, the measured media response is interpreted differently based on the measured media-independent audience profile 222. The media control takes the role of agent 274 that determines how to select the current action—media play—based on the response feedback 270.

FIG. 25 shows an exemplary embodiment of response feedback. In this framework, the reinforcement learning of the optimal media selection rules 431 is realized by temporal difference learning 277. The state S 278 represents the state of the audience pool 201—attitude toward the media content or the products/services that the media content aims to advertise. The temporal difference learning 277 iteratively updates the value function 280 of each state S 278, which captures the cumulative future effectiveness of the media starting from the state S 278. The action A 275 to change the state is then chosen to maximize the value function 280. The goal of the learning is to find the optimal media selection rules 431 to steer the collective mental state of the audience pool toward a state that favors the advertised products/services.

More specifically, the system explores from the current state S 278 to the next state S' 279 and measures the reward R 276. Then the value V(S) 280 at the state S 278 is updated based on the reward R 276 and the value V(S') 281 at the next state S' 279, using the value update equation 277: V(S)←V(S)+ALPHA*[R+GAMMA*V(S')−V(S)]. Here, ALPHA and GAMMA are constants. Finally, the system changes the current state to S' 279. The next action is again chosen to maximize the updated value function. The scheme is known to converge to the optimal solution of the problem.

In this embodiment, the action A is the current media selection rule 431 and the reward R is the media response 250 to the played media content 211 determined from the current media selection rule 431. The state S is assumed to be hidden, and only observable through the media response 250 (the reward R). The cycle of the iteration is a period in which a specific media selection rule 431 (the action A) is being tested; it can be a week, a month, or a season. The described media feedback 270 scheme is also capable of adjusting to a changing environment, such as changes in consumer tastes or needs, or seasonal changes.

Figure 26:
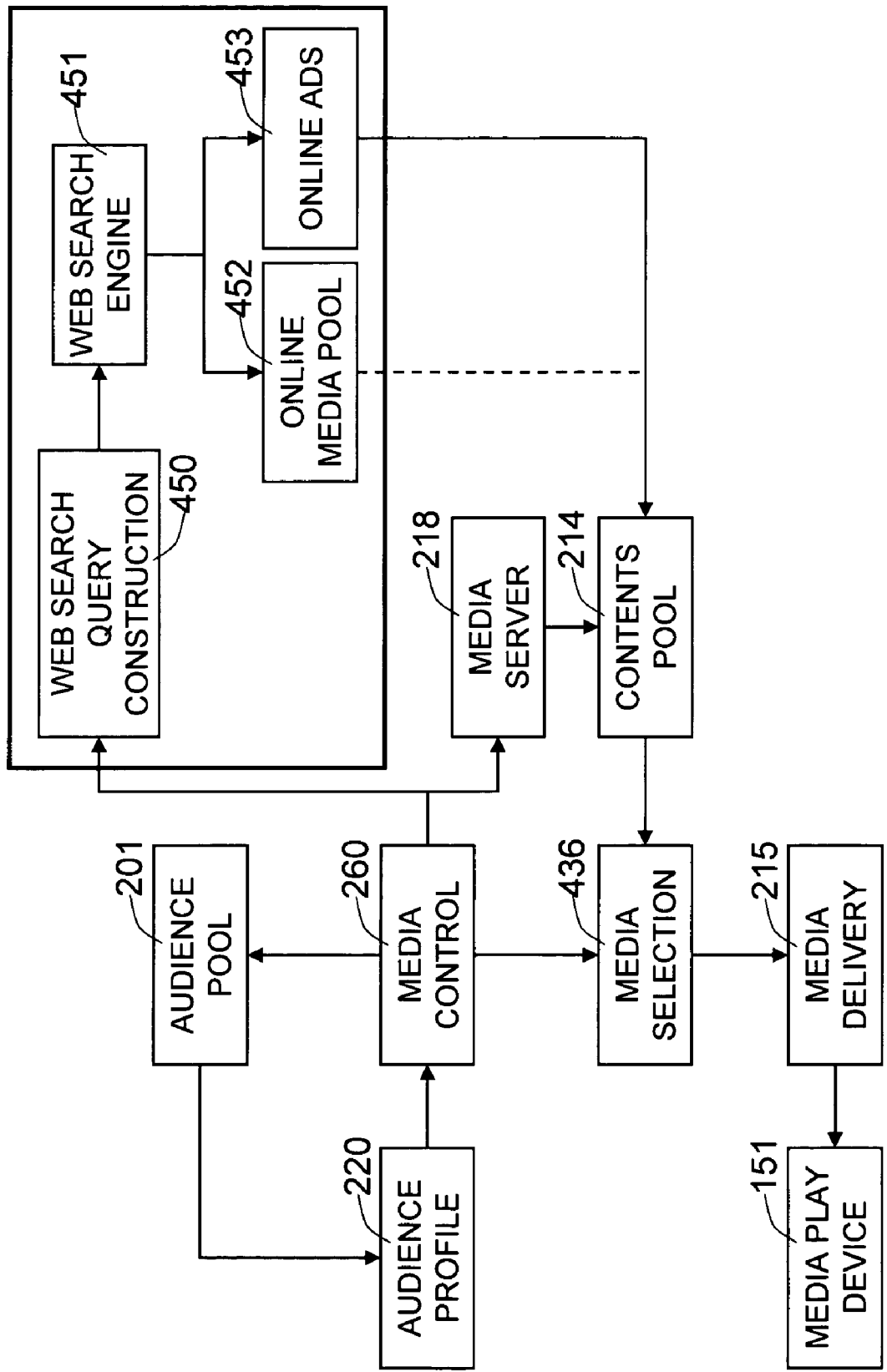
FIG. 26 shows an exemplary embodiment of the present invention with web-based media distribution.

FIG. 26 shows an exemplary embodiment of the present invention with web-based media distribution. The system of the present invention disclosed in FIG. 8 assumes that the media content is stored locally in the media pool database in a media server 218. Such network architecture is called "push," where the media pool is periodically updated with new content.

However, in another exemplary embodiment, the content may be stored in another location, and the media control 260 "pulls" or queries the content, e.g., over the web, based on the audience profile. In an exemplary application with the web, the media control 260 constructs the web search query 450 based on the audience profile 220 information from the audience pool 201. A web search engine 451 uses the web search query to retrieve the media content from an online media pool 452. Relevant online ads 453 can also be retrieved from the web. The retrieved media content from the web can be added to the contents pool 214, and the media can be selected 436 and delivered 215 to the media play device 151.

Figure 27:
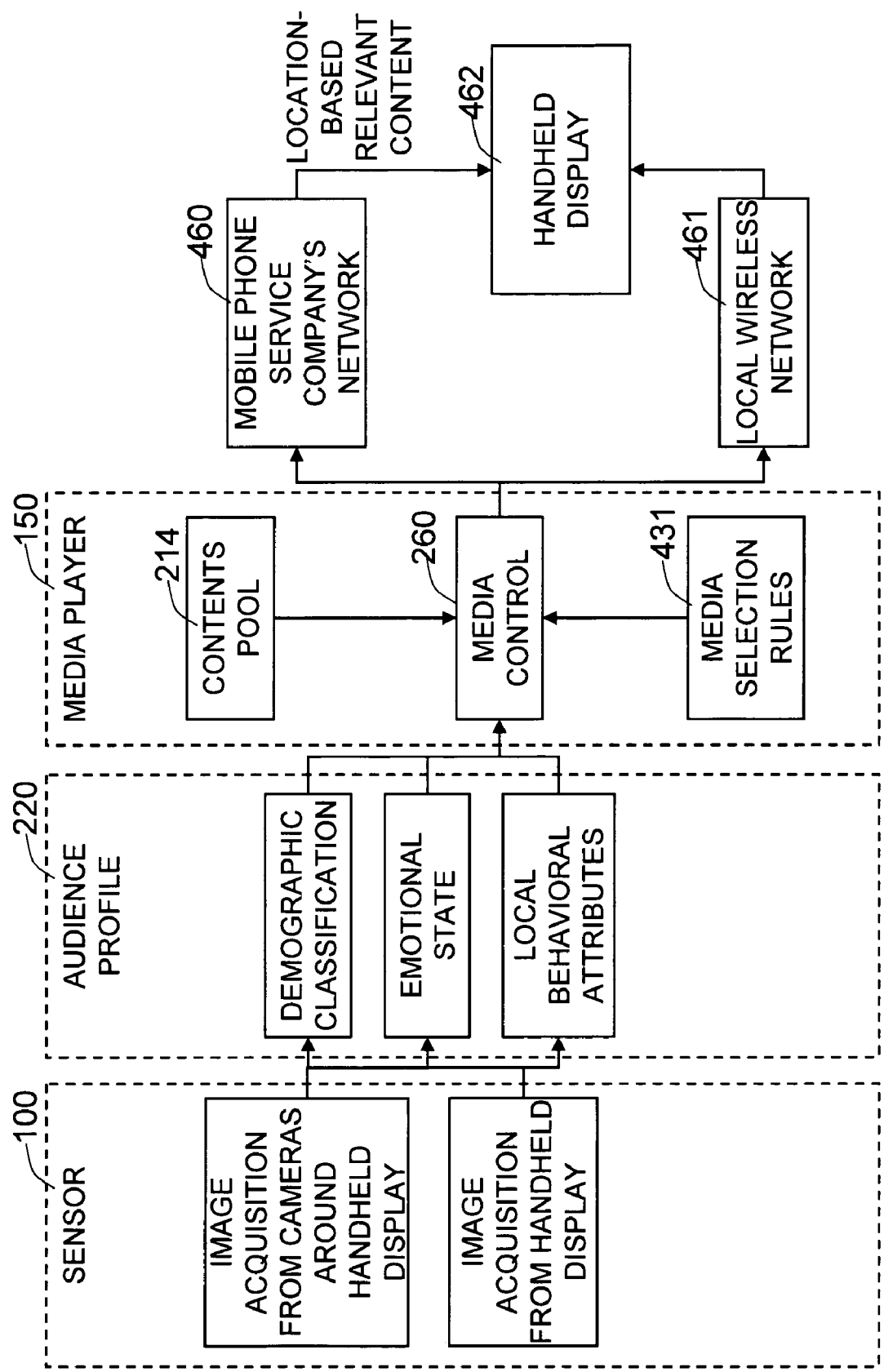
FIG. 27 shows an exemplary embodiment of the present invention for a handheld display

FIG. 27 shows an exemplary embodiment of the present invention for a handheld display 462.

The place-based media, or PBM, that is controlled by the system of the present invention can be any type of digital display that dynamically shows location-based advertising to the audience. PBMs can include fixed digital signage, a mobile phone, digital shopping carts, etc. This figure describes the system of the present invention for a handheld display.

If available, the system of the present invention can use sensors 110 attached to the handheld display to gather audience profile data, or else it can use any other sensor 110 located in the vicinity.

Since the handheld displays are not directly connected to the media player, the media player can use a local wireless network 461, such as Bluetooth and Wi-Fi, or use mobile phone service 460 or satellite connectivity to transfer content to the display. The remaining architecture of the present invention is the same as described in the figures above.

While the above description contains much specificity, these should not be construed as limitations on the scope of the invention, but as exemplifications of the presently preferred embodiments thereof. Other ramifications and variations are possible within the teachings of the invention. Thus, the scope of the invention should be determined by the appended claims and their legal equivalents, and not by the examples given.

What is claimed is:

1. A method for selectively executing targeted media on a means for playing content, comprising the following steps of:
   a) capturing a plurality of images for an individual or people with a single or a plurality of means for capturing images,
   b) detecting a single or a plurality of face images of said individual or said people from said plurality of images using a person detector,
   c) automatically extracting visually perceptible attributes of said individual or said people from said single or plurality of face images using the person detector and a person classifier,
   d) selecting a targeted media from a set of media pools according to the automatically extracted, visually perceptible attributes using a media player,
   e) customizing the targeted media in real-time, based on the automatically-extracted, visually perceptible attributes, including demographic information,
   f) processing a demographic classification in real-time and dynamically narrowcasting the targeted media,
   wherein the method of extracting the demographic information comprises a usage of at least a support vector machine (SVM) that is trained for age and gender, and
   g) displaying the targeted media on the means for playing content,
   wherein the person detector and the person classifier are embodied in a computing device and connected to the means for capturing images and the media player, and wherein the visually perceptible attributes comprise demographic information, local behavior analysis and emotional status.

2. The method according to claim 1, wherein the method further comprises a step of automatically determining the number of people in the scene, computing time spent by the people, determining whether a person looked at the display, extracting visually perceptible attributes of each person,
   wherein the visually perceptible attributes comprise gender, age, height, skin color, and hair color.

3. The method according to claim 1, wherein the method further comprises a step of applying a business rule from a set of media selection rules to a new event that is generated by a person recognizer for the detected person.

4. The method according to claim 1, wherein the method further comprises a step of selecting digital media to be displayed on a network of digital devices, based on the automatically-extracted, visually perceptible attributes, including the demographic information.

5. The method according to claim 1, wherein the method further comprises the steps of:
a) playing random content on the means for playing content,
wherein more than one suitable content for a given audience profile class is available, and a random selection of the content is performed among the available contents based on a probability distribution,
b) automatically analyzing the response of the people to the randomly played content,
c) scoring the content based on the response analysis according to demographic, behavioral, and emotional attributes of the people, and
d) playing a matching content for the people based on the score, according to the demographic, behavioral, and emotional attributes,
wherein a randomization scheme controls the degree of randomness based on the measured response analysis.

6. The method according to claim 1, wherein the method further comprises a step of processing the content search and selection on the Internet, and retrieving the content from the Internet, based on the automatically-extracted, visually perceptible attributes.

7. The method according to claim 1, wherein the method further comprises a step of sending the selected content to a mobile device,
whereby the mobile device comprises a mobile phone and a Bluetooth-based device.

8. The method according to claim 1, wherein the method further comprises a step of processing the images captured by the means for capturing images that are installed in a mobile device,
whereby the mobile device comprises a mobile phone, a cart, and a Bluetooth-based device.

9. The method according to claim 1, wherein the method further comprises a step of installing a second means for capturing images in places where the means for playing content are not located,
wherein the visually perceptible attributes are automatically extracted from the images captured from the second means for capturing images, and
wherein the narrowcasting in the means for playing content is based on the automatically-extracted, visually perceptible attributes.

10. The method according to claim 1, wherein the method further comprises a step of extracting the visually perceptible attributes before the actual appearance of the people in the vicinity of the means for playing content and playing the content that is selected based on the automatically-extracted, visually perceptible attributes while the people approach the means for playing content.

11. The method according to claim 1, wherein the method further comprises a step of classifying the demographics for multiple people and selecting the content based on the analysis of the composition of the multiple people.

12. The method according to claim 1, wherein the method further comprises a step of analyzing the behavior of people in the vicinity of the means for playing content.

13. The method according to claim 1, wherein the method further comprises a step of the measuring emotional state of the people in response to the content, wherein the face images are tracked and fed to a facial expression recognition step to recognize changes in facial features, from which the emotional state of the individual is estimated.

14. The method according to claim 1, wherein the method further comprises a step of randomly selecting media content according to probability densities determined by the match between the audience profile and the targeted media,
wherein more than one suitable content for a given audience profile class is available,
and the random selection is performed among the available contents,
wherein a set of media selection rules is implemented using a table of probability distribution, and
whereby more closely-matched content receives higher probability to be selected.

15. The method according to claim 1, wherein the method further comprises a step of modifying the media selection scheme based on response feedback from the audience utilizing a reinforcement learning method to maximize the effectiveness of the media, wherein the audience takes a role of environment, a media play takes a role of action, and a media response takes a role of a reward, and a media control takes a role of an agent,
wherein the media response is interpreted differently based on a measured media-independent audience profile, and
whereby the response feedback comprises changes in emotional state, viewing duration, and degree of attention toward the media.

16. The method according to claim 15, wherein the method further comprises a step of utilizing a temporal difference learning as a reinforcement learning method to modify the media selection scheme,
wherein the temporal difference learning iteratively updates a value function of each state, which captures the cumulative future effectiveness of the media starting from the state, and
whereby the goal of utilizing the temporal difference learning is to update an optimal media selection scheme.

17. An apparatus, comprising:
a) means for capturing a plurality of images for an individual or people with a single or a plurality of means for capturing images,
b) a person detector for detecting a single or a plurality of face images of said individual or said people from said plurality of images,
c) a person classifier for automatically extracting visually perceptible attributes of said individual or said people from said single or plurality of face images,
d) a media control for customizing a targeted media in a set of media pools in real-time, based on the automatically-extracted, visually perceptible attributes, including demographic information,
e) said person classifier for processing a demographic classification in real-time,
wherein the method of extracting the demographic information comprises a usage of at least a support vector machine (SVM) that is trained for age and gender,
f) a media player for selecting a targeted media from the set of media pools, according to the automatically-extracted, visually perceptible attributes, and
g) means for playing content that selectively displays the targeted media,
wherein the person detector and the person classifier are embodied in a computing device and connected to the means for capturing images and the media player, and
wherein the visually perceptible attributes comprise demographic information, local behavior analysis, and emotional status.

* * * * *